(12) United States Patent
Pechanek et al.

(10) Patent No.: US 7,962,667 B2
(45) Date of Patent: Jun. 14, 2011

(54) SYSTEM CORE FOR TRANSFERRING DATA BETWEEN AN EXTERNAL DEVICE AND MEMORY

(76) Inventors: Gerald G. Pechanek, Cary, NC (US); David Carl Strube, Raleigh, NC (US); Edwin Frank Barry, Cary, NC (US); Charles W. Kurak, Jr., Durham, NC (US); Carl Donald Busboom, Cary, NC (US); Dale Edward Schneider, Durham, NC (US); Nikos P. Pitsianis, Chapel Hill, NC (US); Grayson Morris, Durham, NC (US); Edward A. Wolff, Chapel Hill, NC (US); Patrick R. Marchand, Apex, NC (US); Ricardo E. Rodriguez, Raleigh, NC (US); Marco C. Jacobs, Durham, NC (US)

(*) Notice: Subject to any disclaimer, the term of this patent is extended or adjusted under 35 U.S.C. 154(b) by 1004 days.

(21) Appl. No.: 11/827,548

(22) Filed: Jul. 12, 2007

(65) Prior Publication Data
US 2009/0063724 A1 Mar. 5, 2009

Related U.S. Application Data

(63) Continuation of application No. 10/797,726, filed on Mar. 10, 2004, now Pat. No. 7,266,620, which is a continuation of application No. 09/599,980, filed on Jun. 22, 2000, now Pat. No. 6,748,517.

(60) Provisional application No. 60/140,425, filed on Jun. 22, 1999.

(51) Int. Cl.
*G06F 13/28* (2006.01)
*G06F 13/00* (2006.01)

(52) U.S. Cl. .......................................... 710/22; 710/308
(58) Field of Classification Search .............. 710/22–35, 710/308
See application file for complete search history.

(56) References Cited

U.S. PATENT DOCUMENTS
5,893,153 A * 4/1999 Tzeng et al. ................. 710/22
* cited by examiner

*Primary Examiner* — Christopher B Shin
(74) *Attorney, Agent, or Firm* — Priest & Goldstein, PLLC

(57) ABSTRACT

Details of a highly cost effective and efficient implementation of a manifold array (ManArray) architecture and instruction syntax for use therewith are described herein. Various aspects of this approach include the regularity of the syntax, the relative ease with which the instruction set can be represented in database form, the ready ability with which tools can be created, the ready generation of self-checking codes and parameterized test cases. Parameterizations can be fairly easily mapped and system maintenance is significantly simplified.

21 Claims, 3 Drawing Sheets

FIG. 2

```
                                                        ─ 200 foreach instruction (add mpy sub) (
      # for each processor
      foreach p (s p) (
        # for each conditional execution
        foreach ce (e t. f.) (
          # for each unit that the instruction holds
          foreach unit (a m d) (
            # foreach testvector
            foreach columns in answerset (
              # generate test with these parameters
            )
          )
        )
      )
    )
```

FIG. 3

```
                                                        ─ 300 set instruction(MPY,FORMAT,1sw)       (RTE RX RY)
    set instruction(MPY,FORMAT,1uw)       (RTE RX RY)
    set instruction(MPY,FORMAT,2sh)       (RTE RX RY)
    set instruction(MPY,FORMAT,2uh)       (RTE RX RY)
    set instruction(MPY,RFACCESS)         ((WRITE) (READ) (READ))
    set instruction(MPY,DATATYPES)        (1sw 1uw 2sh 2uh)
    set instruction(MPY,DIFFDATATYPES)    (( 1sw 1sd 1sw 1sw)(1uw 1ud 1uw 1uw)\
                                          (2sh 2sw 2sh 2sh)(2uh 2uw 2uh 2uh))
    set instruction(MPY,PROCS)            (s p)
    set instruction(MPY,UNITS)            (m)
    set instruction(MPY,CE)               (e t.f.c n v z)
    set instruction(MPY,CC)               (e)
    set instruction(MPY,CCOMBO)           (e)
    set instruction(MPY,SUFFIX)           (e)
    set instruction(MPY,CYCLES)           2
```

```
#setting up state
set instruction(MPY,AS,RXb)    {(maxint)}                      {minint}                      }
set instruction(MPY,AS,RYb)    {(maxint)}                      {minint}                      }
set instruction(MPY,AS,Cb)     {(0)}                           {0}                           }
set instruction(MPY,AS,Vb)     {(0)}                           {0}                           }
set instruction(MPY,AS,Nb)     {(0)}                           {0}                           }
set instruction(MPY,AS,Zb)     {(0)}                           {0}                           } specifying desired state.
set instruction(MPY,AS,RTa)    {(mpexpr{maxint}*{maxint})}    {mpexpr{minint}*{minint})}   }
set instruction(MPY,AS,Ca)     {(0)}                           {0}                           }
set instruction(MPY,AS,Va)     {(0)}                           {0}                           }
set instruction(MPY,AS,Na)     {(sign0unsil)}                  {0}                           }
set instruction(MPY,AS,Za)     {(0)}                           {sign0unsil}                  }
```

SYSTEM CORE FOR TRANSFERRING DATA BETWEEN AN EXTERNAL DEVICE AND MEMORY

RELATED APPLICATIONS

The present application is a continuation of U.S. Ser. No. 10/797,726 filed Mar. 10, 2004 issued as U.S. Pat. No. 7,266,620 which is a continuation of U.S. Ser. No. 09/599,980 filed Jun. 22, 2000 issued as U.S. Pat. No. 6,748,517 which claims the benefit of U.S. Provisional Application Ser. No. 60/140,425 filed Jun. 22, 1999 all of which are incorporated herein by reference in their entirety.

FIELD OF THE INVENTION

The present invention relates generally to improvements to parallel processing, and more particularly to such processing in the framework of a ManArray architecture and instruction syntax.

BACKGROUND OF THE INVENTION

A wide variety of sequential and parallel processing architectures and instruction sets are presently existing. An ongoing need for faster and more efficient processing arrangements has been a driving force for design change in such prior art systems. One response to these needs have been the first implementations of the ManArray architecture. Even this revolutionary architecture faces ongoing demands for constant improvement.

SUMMARY OF THE INVENTION

To this end, the present invention addresses a host of improved aspects of this architecture and a presently preferred instruction set for a variety of implementations of this architecture as described in greater detail below. Among the advantages of the improved ManArray architecture and instruction set described herein are that the instruction syntax is regular. Because of this regularity, it is relatively easy to construct a database for the instruction set. With the regular syntax and with the instruction set represented in database form, developers can readily create tools, such as assemblers, disassemblers, simulators or test case generators using the instruction database. Another aspect of the present invention is that the syntax allows for the generation of self-checking codes from parameterized test vectors. As addressed further below, parameterized test case generation greatly simplifies maintenance. It is also advantageous that parameterization can be fairly easily mapped.

These and other features, aspects and advantages of the invention will be apparent to those skilled in the art from the following detailed description taken together with the accompanying drawings.

BRIEF DESCRIPTION OF THE DRAWINGS

FIG. 2 illustrates an exemplary test case generator program in accordance with the present invention;

FIG. 3 illustrates an entry from an instruction-description data structure for a multiply instruction (MPY); and FIG. 4 illustrates an entry from an MAU-answer set for the MPY instruction.

DETAILED DESCRIPTION

Figure 1:
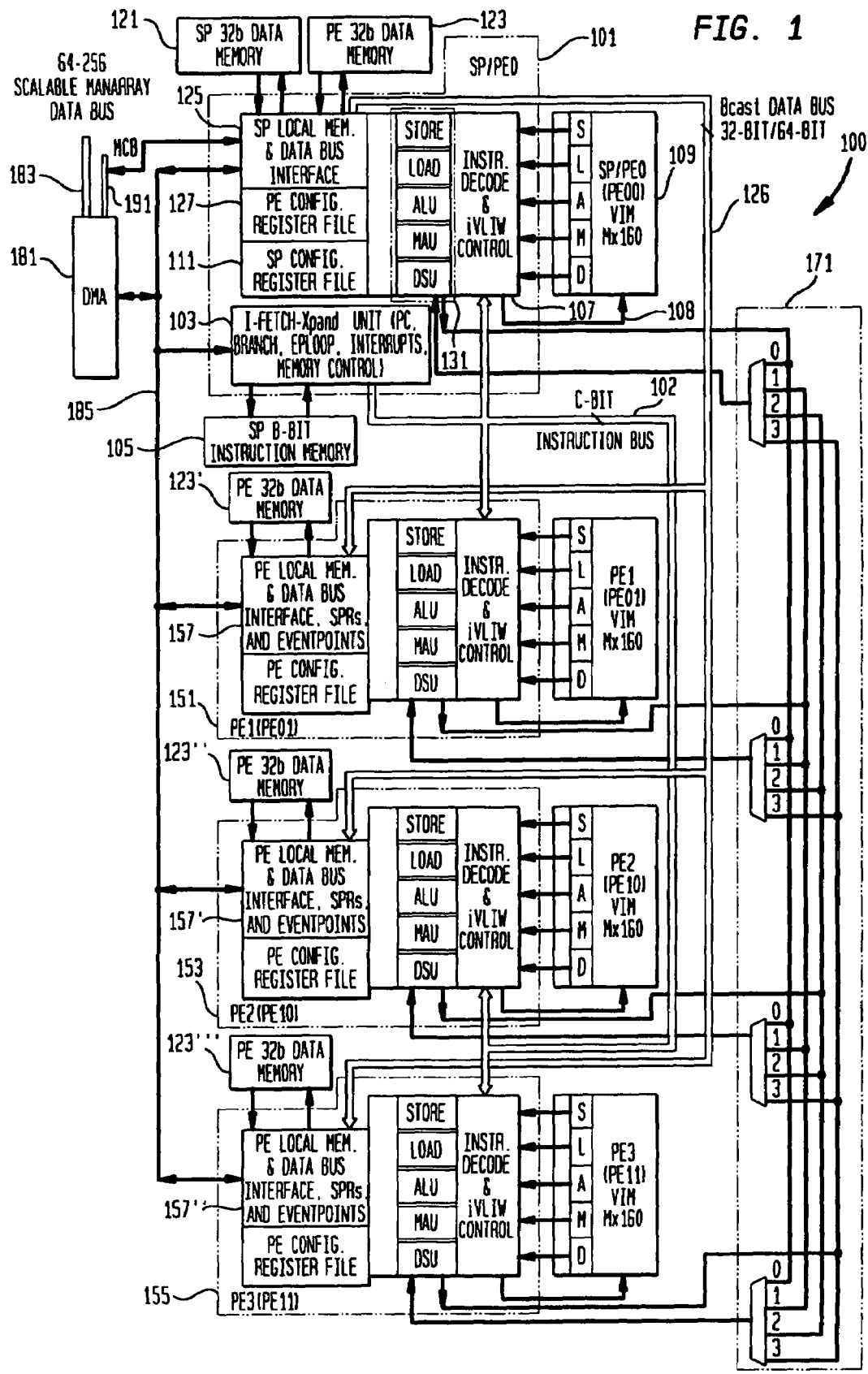
FIG. 1 illustrates an exemplary ManArray 2×2 iVLIW processor showing the connections of a plurality of processing elements connected in an array topology for implementing the architecture and instruction syntax of the present invention.

Further details of a presently preferred ManArray core, architecture, and instructions for use in conjunction with the present invention are found in U.S. patent application Ser. No. 08/885,310 filed Jun. 30, 1997, now U.S. Pat. No. 6,023,753, U.S. patent application Ser. No. 08/949,122 filed Oct. 10, 1997, U.S. patent application Ser. No. 09/169,255 filed Oct. 9, 1998, U.S. patent application Ser. No. 09/169,256 filed Oct. 9, 1998, U.S. patent application Ser. No. 09/169,072 filed Oct. 9, 1998, U.S. patent application Ser. No. 09/187,539 filed Nov. 6, 1998, U.S. patent application Ser. No. 09/205,558 filed Dec. 4, 1998, U.S. patent application Ser. No. 09/215,081 filed Dec. 18, 1998, U.S. patent application Ser. No. 09/228,374 filed Jan. 12, 1999 and entitled "Methods and Apparatus to Dynamically Reconfigure the Instruction Pipeline of an Indirect Very Long Instruction Word Scalable Processor", U.S. patent application Ser. No. 09/238,446 filed Jan. 28, 1999, U.S. patent application Ser. No. 09/267,570 filed Mar. 12, 1999, U.S. patent application Ser. No. 09/337,839 filed Jun. 22, 1999, U.S. patent application Ser. No. 09/350,191 filed Jul. 9, 1999, U.S. patent application Ser. No. 09/422,015 filed Oct. 21, 1999 entitled "Methods and Apparatus for Abbreviated Instruction and Configurable Processor Architecture", U.S. patent application Ser. No. 09/432,705 filed Nov. 2, 1999 entitled "Methods and Apparatus for Improved Motion Estimation for Video Encoding", U.S. patent application Ser. No. 09/471,217 filed Dec. 23, 1999 entitled "Methods and Apparatus for Providing Data Transfer Control", U.S. patent application Ser. No. 09/472,372 filed Dec. 23, 1999 entitled "Methods and Apparatus for Providing Direct Memory Access Control", U.S. patent application Ser. No. 09/596,103 entitled "Methods and Apparatus for Data Dependent Address Operations and Efficient Variable Length Code Decoding in a VLIW Processor" filed Jun. 16, 2000, U.S. patent application Ser. No. 09/598,566 entitled "Methods and Apparatus for Generalized Event Detection and Action specification in a Processor" filed Jun. 21, 2000, U.S. patent application Ser. No. 09/598,567 entitled "Methods and Apparatus for Improved Efficiency in Pipeline Simulation and Emulation" filed Jun. 21, 2000, U.S. patent application Ser. No. 09/598,564 entitled "Methods and Apparatus for Initiating and Resynchronizing Multi-Cycle SIMD Instructions" filed Jun. 21, 2000, U.S. patent application Ser. No. 09/598,558 entitled "Methods and Apparatus for Providing Manifold Array (ManArray) Program Context Switch with Array Reconfiguration Control" filed Jun. 21, 2000, and U.S. Patent application Ser. No. 09/598,084 entitled "Methods and Apparatus for Establishing Port Priority Functions in a VLIW Processor" filed Jun. 21, 2000, as well as, Provisional Application Ser. No. 60/113,637 entitled "Methods and Apparatus for Providing Direct Memory Access (DMA) Engine" filed Dec. 23, 1998, Provisional Application Ser. No. 60/113,555 entitled "Methods and Apparatus Providing Transfer Control" filed Dec. 23, 1998, Provisional Application Ser. No. 60/139,946 entitled "Methods and Apparatus for Data Dependent Address Operations and Efficient Variable Length Code Decoding in a VLIW Processor" filed Jun. 18, 1999, Provisional Application Ser. No. 60/140,245 entitled "Methods and Apparatus for Generalized Event Detection and Action Specification in a Processor" filed Jun. 21, 1999, Provisional Application Ser. No. 60/140,163 entitled "Methods and Apparatus for Improved Efficiency in Pipeline Simulation and Emulation" filed Jun. 21, 1999, Provisional Application Ser. No. 60/140,162 entitled "Methods and Apparatus for Initiating and Re-Synchronizing Multi-Cycle SIMD Instructions" filed Jun. 21, 1999, Provisional Application Ser. No. 60/140,244 entitled "Methods and Apparatus for Providing One-By-One Manifold Array (1×1 ManArray) Program Context Control" filed Jun. 21, 1999, Provisional Application Ser. No. 60/140,325 entitled "Methods and Apparatus for Establishing Port Priority Function in a VLIW Processor" filed Jun. 21, 1999, Provisional Application Ser. No. 60/140, 425 entitled "Methods and Apparatus for Parallel Processing Utilizing a Manifold Array (ManArray) Architecture and Instruction Syntax" filed Jun. 22, 1999, Provisional Application Ser. No. 60/165,337 entitled "Efficient Cosine Transform Implementations on the ManArray Architecture" filed Nov. 12, 1999, and Provisional Application Ser. No. 60/171,911 entitled "Methods and Apparatus for DMA Loading of Very Long Instruction Word Memory" filed Dec. 23, 1999, Provisional Application Ser. No. 60/184,668 entitled "Methods and Apparatus for Providing Bit-Reversal and Multicast Functions Utilizing DMA Controller" filed Feb. 24, 2000, Provisional Application Ser. No. 60/184,529 entitled "Methods and Apparatus for Scalable Array Processor Interrupt Detection and Response" filed Feb. 24, 2000, Provisional Application Ser. No. 60/184,560 entitled "Methods and Apparatus for Flexible Strength Coprocessing Interface" filed Feb. 24, 2000, Provisional Application Ser. No. 60/203, 629 entitled "Methods and Apparatus for Power Control in a Scalable Array of Processor Elements" filed May 12, 2000, and Provisional Application Ser. No. 60/212,987 entitled "Methods and Apparatus for Indirect VLIW Memory Allocation" filed Jun. 21, 2000, respectively, all of which are assigned to the assignee of the present invention and incorporated by reference herein in their entirety.

All of the above noted patents and applications, as well as any noted below, are assigned to the assignee of the present invention and incorporated herein in their entirety.

In a presently preferred embodiment of the present invention, a ManArray 2×2 iVLIW single instruction multiple data stream (SIMD) processor 100 shown in FIG. 1 contains a controller sequence processor (SP) combined with processing element-0 (PE0) SP/PE0 101, as described in further detail in U.S. application Ser. No. 09/169,072 entitled "Methods and Apparatus for Dynamically Merging an Array Controller with an Array Processing Element". Three additional PEs 151, 153, and 155 are also utilized to demonstrate improved parallel array processing with a simple programming model in accordance with the present invention. It is noted that the PEs can be also labeled with their matrix positions as shown in parentheses for PE0 (PE00) 101, PE1 (PE01) 151, PE2 (PE10) 153, and PE3 (PE11) 155. The SP/PE0 101 contains a fetch controller 103 to allow the fetching of short instruction words (SIWs) from a B=32-bit instruction memory 105. The fetch controller 103 provides the typical functions needed in a programmable processor such as a program counter (PC), branch capability, digital signal processing eventpoint loop operations, support for interrupts, and also provides the instruction memory management control which could include an instruction cache if needed by an application. In addition, the SIW I-Fetch controller 103 dispatches 32-bit SIWs to the other PEs in the system by means of a 32-bit instruction bus 102.

In this exemplary system, common elements are used throughout to simplify the explanation, though actual implementations are not so limited. For example, the execution units 131 in the combined SP/PE0 101 can be separated into a set of execution units optimized for the control function, e.g. fixed point execution units, and the PE0 as well as the other PEs 151, 153 and 155 can be optimized for a floating point application. For the purposes of this description, it is assumed that the execution units 131 are of the same type in the SP/PE0 and the other PEs. In a similar manner, SP/PE0 and the other PEs use a five instruction slot iVLIW architecture which contains a very long instruction word memory (VIM) memory 109 and an instruction decode and VIM controller function unit 107 which receives instructions as dispatched from the SP/PE0's I-Fetch unit 103 and generates the VIM addresses-and-control signals 108 required to access the iVLIWs stored in the VIM. These iVLIWs are identified by the letters SLAMD in VIM 109. The loading of the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common PE configurable register file 127 which is described in further detail in U.S. patent application Ser. No. 09/169,255 entitled "Methods and Apparatus for Dynamic Instruction Controlled Reconfiguration Register File with Extended Precision".

Due to the combined nature of the SP/PE0, the data memory interface controller 125 must handle the data processing needs of both the SP controller, with SP data in memory 121, and PE0, with PE0 data in memory 123. The SP/PE0 controller 125 also is the source of the data that is sent over the 32-bit broadcast data bus 126. The other PEs 151, 153, and 155 contain common physical data memory units 123', 123", and 123''' though the data stored in them is generally different as required by the local processing done on each PE. The interface to these PE data memories is also a common design in PEs 1, 2, and 3 and indicated by PE local memory and data bus interface logic 157, 157' and 157".

Interconnecting the PEs for data transfer communications is the cluster switch 171 more completely described in U.S. Pat. No. 6,023,753 entitled "Manifold Array Processor", U.S. application Ser. No. 09/949,122 entitled "Methods and Apparatus for Manifold Array Processing", and U.S. application Ser. No. 09/169,256 entitled "Methods and Apparatus for ManArray PE-to-PE Switch Control". The interface to a host processor, other peripheral devices, and/or external memory can be done in many ways. The primary mechanism shown for completeness is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray Control Bus (MCB) 191 is also shown.

Turning now to specific details of the ManArray architecture and instruction syntax as adapted by the present invention, this approach advantageously provides a variety of benefits. Among the benefits of the ManArray instruction syntax, as further described herein, is that first the instruction syntax is regular. Every instruction can be deciphered in up to four parts delimited by periods. The four parts are always in the same order which lends itself to easy parsing for automated tools. An example for a conditional execution (CE) instruction is shown below:

(CE).(NAME).(PROCESSOR/UNIT).(DATATYPE)

Below is a brief summary of the four parts of a ManArray instruction as described herein:
(1) Every instruction has an instruction name.
(2A) Instructions that support conditional execution forms may have a leading (T. or F.) or . . .
(2B) Arithmetic instructions may set a conditional execution state based on one of four flags (C=carry, N=sign, V=overflow, Z=zero).
(3A) Instructions that can be executed on both an SP and a PE or PEs specify the target processor via (.S or .P) designations. Instructions without an .S or .P designation are SP control instructions.
(3B) Arithmetic instructions always specify which unit or units that they execute on (A=ALU, M=MAU, D=DSU).

(3C) Load/Store instructions do not specify which unit (all load instructions begin with the letter 'L' and all stores with letter 'S'.
(4A) Arithmetic instructions (ALU, MAU, DSU) have data types to specify the number of parallel operations that the instruction performs (e.g., 1, 2, 4 or 8), the size of the data type (D=64 bit doubleword, W=32 bit word, H=16 bit halfword, B=8 bit byte, or FW=32 bit floating point) and optionally the sign of the operands (S=Signed, U=Unsigned).
(4B) Load/Store instructions have single data types (D=doubleword, W=word, H1=high halfword, H0=low halfword, B0=byte0).

The above parts are illustrated for an exemplary instruction below:

```
[TF.] instr [CNVZ].    [SP]     [AMD]. [1248] [SU][DWHBF]
                                       [DWH1H0B]
                                                +--(4A) Arithmetic Data Type 1SD, 1UD, 1D,
     1SW, 1UW, 1W,  2SW, 2UW, 2UW,
                                        +--(4B) Load/Store Data Type (D, W, H1, H0, B)

+--(3B) Arithmatic Unit (ALU, MAU, DSU)
                                     (3C) Load/Store Instructions do not specify which unit +--(3A) Target processor (.S for SP, .P for PE)

+--(2B) Set conditional execution state based on flag (C N V Z)

+--(1) Instruction name (ADD, SUB, etc. . .)

+--(2A) Conditional execution (Execute if true T. or execute if false F.)
```

Second, because the instruction set syntax is regular, it is relatively easy to construct a database for the instruction set. The database is organized as instructions with each instruction record containing entries for conditional execution (CE), target processor (PROCS), unit (UNITS), datatypes (DATATYPES) and operands needed for each datatype (FORMAT). The example below using TcLsyntax, as further described in J. Ousterhout, *Tcl and the Tk Toolkit*, Addison-Wesley, ISBN 0-201-63337-X, 1994, compactly represents all 196 variations of the ADD instruction.

The 196 variations come from (CE)*(PROCS)*(UNITS)* (DATATYPES)=7*2*2*7=196. It is noted that the 'e' in the CE entry below is for unconditional execution.

| | |
|---|---|
| set instruction(ADD,CE) | {e t. f. c n v z} |
| set instruction(ADD,PROCS) | {s p} |
| set instruction(ADD,UNITS) | {a m} |
| set instruction(ADD,DATATYPES) | {1d 1w 2w 2h 4h 8b} |
| set instruction(ADD,FORMAT,1d) | {RTE RXE RYE} |
| set instruction(ADD,FORMAT,1w) | {RT RX RY} |
| set instruction(ADD,FORMAT,2w) | {RTE RXE RYE} |
| set instruction(ADD,FORMAT,2h) | {RT RX RY} |
| set instruction(ADD,FORMAT,4h) | {RTE RXE RYE} |
| set instruction(ADD,FORMAT,4b) | {RT RX RY} |
| set instruction(ADD,FORMAT,8b) | {RTE RXE RYE} |

The example above only demonstrates the instruction syntax. Other entries in each instruction record include the number of cycles the instruction takes to execute (CYCLES), encoding tables for each field in the instruction (ENCODING) and configuration information (CONFIG) for subsetting the instruction set. Configuration information (1×1, 1×2, etc.) can be expressed with evaluations in the database entries:

```
proc Manta { } {
# are we generating for Manta?
    return 1
# are we generating for ManArray?
# return 0
}
set instruction(MPY,CE) [Manta]? {e t. f.}:{e t. f. c n v z}
```

Having the instruction set defined with a regular syntax and represented in database form allows developers to create tools using the instruction database. Examples of tools that have been based on this layout are:

Assembler (drives off of instruction set syntax in database),
Disassembler (table lookup of encoding in database),
Simulator (used database to generate master decode table for each possible form of instruction), and
Testcase Generators (used database to generate testcases for assembler and simulator).

Another aspect of the present invention is that the syntax of the instructions allows for the ready generation of self-checking code from test vectors parameterized over conditional execution/datatypes/sign-extension/etc. TCgen, a test case generator, and LSgen are exemplary programs that generate self-checking assembly programs that can be run through a Verilog simulator and C-simulator.

An outline of a TCgen program 200 in accordance with the present invention is shown in FIG. 2. Such programs can be used to test all instructions except for flow-control and iVLIW instructions. TCgen uses two data structures to accomplish this result. The first data structure defines instruction-set syntax (for which datatypes/ce[1,2,3]/sign extension/rounding/operands is the instruction defined) and semantics (how many cyles/does the instruction require to be executed, which operands are immediate operands, etc.). This data structure is called the instruction-description data structure.

An instruction-description data structure 300 for the multiply instruction (MPY) is shown in FIG. 3 which illustrates an actual entry out of the instruction-description for the multiply instruction (MPY) in which e stands for empty. The second data structure defines input and output state for each instruction. An actual entry out of the MAU-answer set for the MPY instruction 400 is shown in FIG. 4. State can contain functions which are context sensitive upon evaluation. For instance, when defining an MPY test vector, one can define: $RX_b$ (RX before)=maxint, $RY_b$ (RY before)=maxint, $RT_a$=maxint*maxint. When TCgen is generating an unsigned word form of the MPY instruction, the maxint would evaluate to 0xffffffff. When generating an unsigned halfword form, however, it would evaluate to 0xffff. This way the test vectors are parameterized over all possible instruction variations. Multiple test vectors are used to set up and check state for packed data type instructions.

The code examples of FIGS. 3 and 4 are in Tcl syntax, but are fairly easy to read. "Set" is an assignment, ( ) are used for array indices and the { } are used for defining lists. The only functions used in FIG. 4 are "maxint", "minint", "sign0unsi1", "sign1unsi0", and an arbitrary arithmetic expression evaluator (mpexpr). Many more such functions are described herein below.

TCgen generates about 80 tests for these 4 entries, which is equivalent to about 3000 lines of assembly code. It would take a long time to generate such code by hand. Also, parameterized testcase generation greatly simplifies maintenance. Instead of having to maintain 3000 lines of assembly code, one only needs to maintain the above defined vectors. If an instruction description changes, that change can be easily made in the instruction-description file. A configuration dependent instruction-set definition can be readily established. For instance, only having word instructions for the ManArray, or fixed point on an SP only, can be fairly easily specified.

Test generation over database entries can also be easily subset. Specifying "SUBSET(DATATYPES) {1sw 1sh}" would only generate testcases with one signed word and one signed halfword instruction forms. For the multiply instruction (MPY), this means that the unsigned word and unsigned halfword forms are not generated. The testcase generators TelRita and TelRitaCorita are tools that generate streams of random (albeit with certain patterns and biases) instructions. These instruction streams are used for verification purposes in a co-verification environment where state between a C-simulator and a Verilog simulator is compared on a per-cycle basis.

Utilizing the present invention, it is also relatively easy to map the parameterization over the test vectors to the instruction set since the instruction set is very consistent.

Further aspects of the present invention are addressed in the Manta User and Reference Information found in U.S. Pat. Nos. 6,748,517 and 7,266,620 at cols. 9-1050. That documentation is divided into the following principle sections:
Section I—Table of Contents;
Section II—Programmer's User's Guide (PUG);
Section III—Programmer's Reference (PREF).

The Programmer's User's Guide Section addresses the following major categories of material and provides extensive details thereon: (1) an architectural overview; (2) processor registers; (3) data types and alignment; (4) addressing modes; (5) scalable conditional execution (CE); (6) processing element (PE) masking; (7) indirect very long instruction words (iVLIWs); (8) looping; (9) data communication instructions; (10) instruction pipeline; and (11) extended precision accumulation operations.

The Programmer's Reference Section addresses the following major categories of material and provides extensive details thereof: (1) floating-point (FP) operations, saturation and overflow; (2) saturated arithmetic; (3) complex multiplication and rounding; (4) key to instruction set; (5) instruction set; (6) instruction formats, as well as, instruction field definitions.

Memory Map

Table of Contents

1 Overview
2 MDB Bus Master View
3 Non-SP MCB Master View
4 SP MCB Master View
5 Manta Address Map - PE View (Load/Store)
6 System Address Map - SP View

1 Overview

The Manta coprocessor core, containing the Manta 2x2 DSP array and the Manta DMA controller, communicates with "off-core" devices via the ManArray Control Bus (MCB) and the ManArray Data Bus (MDB). The SP provides one bus master on the MCB and the DMA controller provides a bus master on the MDB for each Lane (Lane 0 and Lane 1) and a bus master on the MCB which serves both Lane Controllers. In addition, the DMA controller provides two bus masters on the DMA Bus (on-core) which connects the 2x2 local memories with the DMA controller.

The address spaces described in the following sections show the address spaces as seen from:

- An MDB Master
- An SP MCB Master (alternate view of MCB SP-local resources)
- A non-SP MCB Master
- A DMA Bus Master (the two Lane Controllers within the DMA unit are the only masters)

An SP MCB master is provided with an alternate view of the MCB address space for its own local resources (DMA controller in particular) which allows SP code to be portable.

2 MDB Bus Master View

0x00000000 - 0x03FFFFFF SDRAM
0x04000000 - 0x07FFFFFF FLASH ROM
0x08000000 - 0x0BFFFFFF PCI Window
0x0C000000 - 0x0FFFFFFF MPB
0x10000000 - 0x10FFFFFF Manta I/O
0x10800000 - 0x108FFFFF DMA MDB Slave Lane 0
0x10900000 - 0x109FFFFF DMA MDB Slave Lane 1
0x14000000 - 0x7FFFFFFF PCI (mapped @0x80000000)
0x80000000 - 0xFFFFFFFF PCI (mapped @0x00000000)

These addresses are those used by any MDB master. The DMA controller has an MDB master for the System Transfer Unit (STU) associated with each Lane. This address map is used to specify DMA transfer addresses when coding TSI and TSO-type transfer instructions.

3 Non-SP MCB Master View

0x00500000 - 0x00507FFF SP Instruction Memory
0x00700000 - 0x007003FF SP SPR registers visible on the MDB
0x00708000 - 0x007083FF DMA Lane Controller 0
0x00708400 - 0x007087FF DMA Lane Controller 1
0x40000000 - 0xFFFFFFFF Mapped to MCB-MDB Bridge
0x14000000 - 0x17FFFFFF SDRAM (via MCB-MDB Bridge)

4 SP MCB Master View

The SP has an alternate view of the MCB address space, which allows SP code to be portable to multiple SPs sharing the same bus (assuming that they are programming their own local resources). By using the following address ranges, the SP is accessing its "own" instruction memory and DMA controller. Address translation, which is based upon the SP's ID, is performed in the SP MBIU (Memory/Bus Interface Unit) to place the correct address on the MCB.

0x00100000 - 0x00107FFF SP Instruction Memory
0x00308000 - 0x003083FF DMA Lane Controller 0
0x00308400 - 0x003087FF DMA Lane Controller 1

Special Purpose Register space (SPR space) is addressed using LSPR (load from SPR) and SSPR (store to SPR) instructions. The SP can still access SPRs via the MCB using non-SP MCB master addresses although at a significant performance penalty. (This is typically useful for test purposes).

5 Manta Address Map - PE View (Load/Store)

PEs can only access their own local memories with Load/Store instructions. PE memories are referenced by PE Load/Store instructions starting from address 0x00000000 up to N-1, where N is the size of the memory in bytes. Bits [31:12] are treated as "don't care" by the hardware, but should be set to zero for software compatibility with future hardware that extends the PE memories.

Manta Memory Map - PE (Load/Store) View of its local resources

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 000000000000000000 | | | | | | | | | | | | | | | | | | PE Local Data memory (16KB) | | | | | | | | | | | | | |

6 System Address Map - SP View

| General System Address | SP-Relative System Address (bits[25:22]=0) | LSPR /SSPR Address | SP Memory/ SPR Registers | PE Memory/ SPR Registers | Description |
|---|---|---|---|---|---|
| 0x00000000- 0x07FFFFFF | 0x00000000- 0x03FFFFFF | | Manta Load/Store Address Space | | Entire Manta Load/Store address space (64 MB) |
| 0x00000000- 0x00007FFF | 0x00000000- 0x00007FFF | | SP Data Memory | | SP Data Memory. 8K 32-bit words. (16KB) |
| 0x00100000- 0x00107FFF | 0x00100000- 0x00107FFF | | SP Instruction Memory | | SP Instruction Memory. 8K 32-bit instructions.(32 KB). Visible to MCB and DMA. |
| 0x00200000- 0x00203fff | --- | | PE0 Data Memory | | Not visible on MCB. This range is visible to DMA controller only. |
| 0x00210000- 0x00213fff | --- | | PE1 Data Memory | | Not visible on MCB. This range is visible to DMA controller only. |
| 0x00220000- 0x00223fff | --- | | PE2 Data Memory | | Not visible on MCB. This range is visible to DMA controller only. |
| 0x00230000- 0x00233fff | --- | | PE3 Data Memory | | Not visible on MCB. This range is visible to DMA controller only. |
| 0x00700000- 0x0070FFFF | 0x00300000- 0x0030FFFF | | Local MCB SPR space | | Local Special Purpose Register Space (64 KB space). Registers in this space are considered "local" to an SP/PE cluster (though they are accessible to any MCB master device. All registers except DMA registers are accessible in the DSP's SPR space, accessible using LSPR/SSPR instructions. |
| 0x00700000 | 0x00300000 | 0x0000 | MBSTAT | | Mailbox Status register. An LSPR (read) from this address clears MPBSTAT.MBF0 |
| 0x00700001 | 0x00300001 | 0x0001 | MBSTATNC | | LSPR with this address returns data but does not clear MBSTAT.MBF0 |
| 0x00700004 | 0x00300004 | 0x0004 | MBOX1 | | LSPR with this address returns data from MBOX1 and clears MBSTAT.MBF1 |
| 0x00700005 | 0x00300005 | 0x0005 | MBOX1NC | | LSPR with this address returns data from MBOX1 and does not clear MBSTAT.MBF1 |
| 0x00700008 | 0x00300008 | 0x0008 | MBOX2 | | LSPR with this address returns data from MBOX2 and clears MBSTAT.MBF2 |
| 0x00700009 | 0x00300009 | 0x0009 | MBOX2NC | | LSPR with this address returns data from MBOX2 and does not clear MBSTAT.MBF2 |
| 0x0070000c | 0x0030000c | 0x000c | MBOX3 | | SSPR with this address writes data to MBOX3 and clears MBSTAT.MBE3 |
| | | | | | |

DMA Subsystem Overview

Table of Contents

1 Introduction
2 Simple Inbound Transfer to SP Data Memory 2.1 Simple Inbound Transfer of Program Code to the SP Instruction Memory
2.2 Simple Inbound Transfer of Application Data to a PE Data Memory
2.3 Interleaved Selection of PE Data Memory Destinations
2.4 DMA Instruction Control Unit 3 Instruction Set Overview

1 Introduction

The Manta co-processor core consists of:

- a ManArray 2x2 DSP array,
- local memories,
- a set of special-purpose registers (SPRs),
- a DMA Controller,
- and three primary system busses.

The primary system busses, which provide connectivity inside and outside the coprocessor core, are:

1. the ManArray Data Bus (MDB) which provides high volume data flow into and out of the DSP core,
2. the ManArray Control Bus (MCB) which provides a path for peripheral access and control, and
3. the DMA Bus (consisting of two identical 32-bit lanes) which provides the data path between MDB devices and the PE local memories.

The DMA controller complements the high-performance signal processor: enabling flexible data transfer between off-core devices and local memories while minimizing array processor overhead.

Figure 1. shows where the DMA controller fits into the Manta coprocessor core.

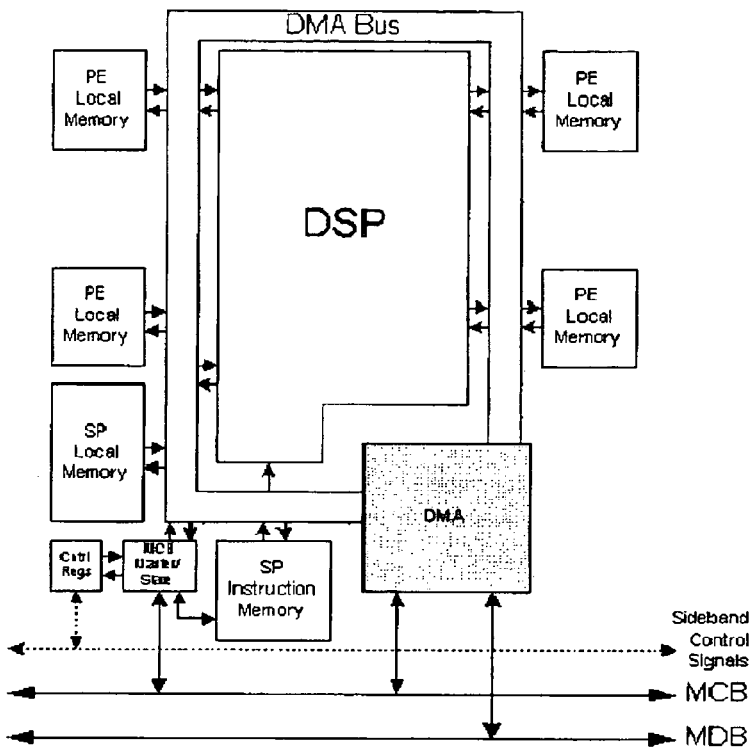

*Figure 1. Manta coprocessor core: DMA Controller Interfaces and DSP array.*

Figure 2 shows the DSP array elements in addition to the DMA controller and memories. The Local Memory Interface Units (LMIUs), the SP Data Memory Interface Unit (SPDMIU) and the SP Instruction Memory Interface Unit (SPIMIU) arbitrate between the DSP array and the DMA controller for memory access. The DSP array (comprising PE0...PE3) always has preference in the case of conflicting accesses.

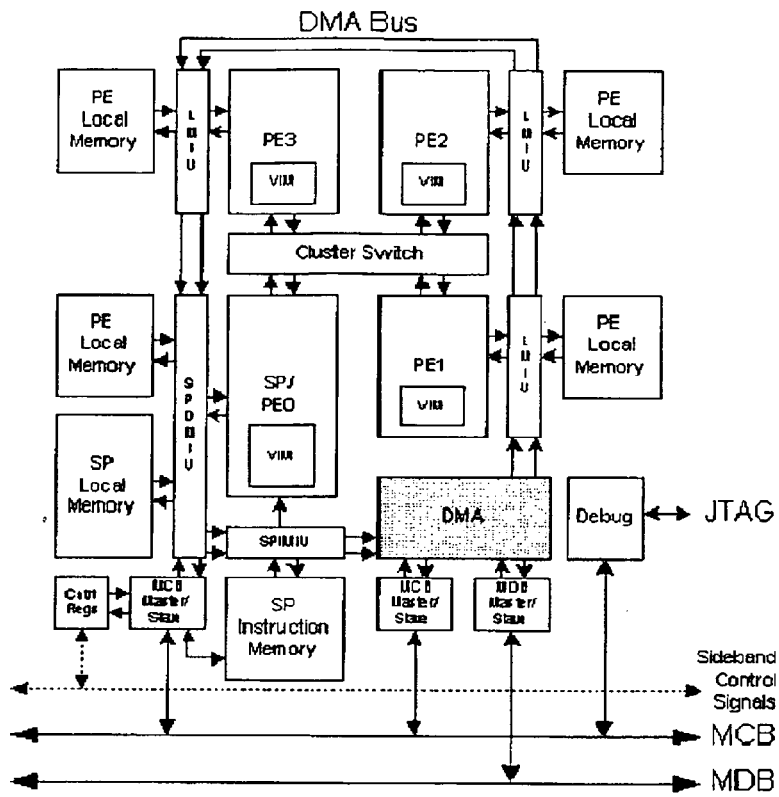

*Figure 2 Manta coprocessor core: DMA Controller Interfaces and DSP array elements.*

Figure 3 shows the structure of the DMA controller and its two independent lane controllers. Each lane controller can manage a single transfer, either Inbound (from MDB to DMA Bus) or Outbound (from DMA bus to MDB), at any given time. Hence, two DMA transfers can be in progress simultaneously.

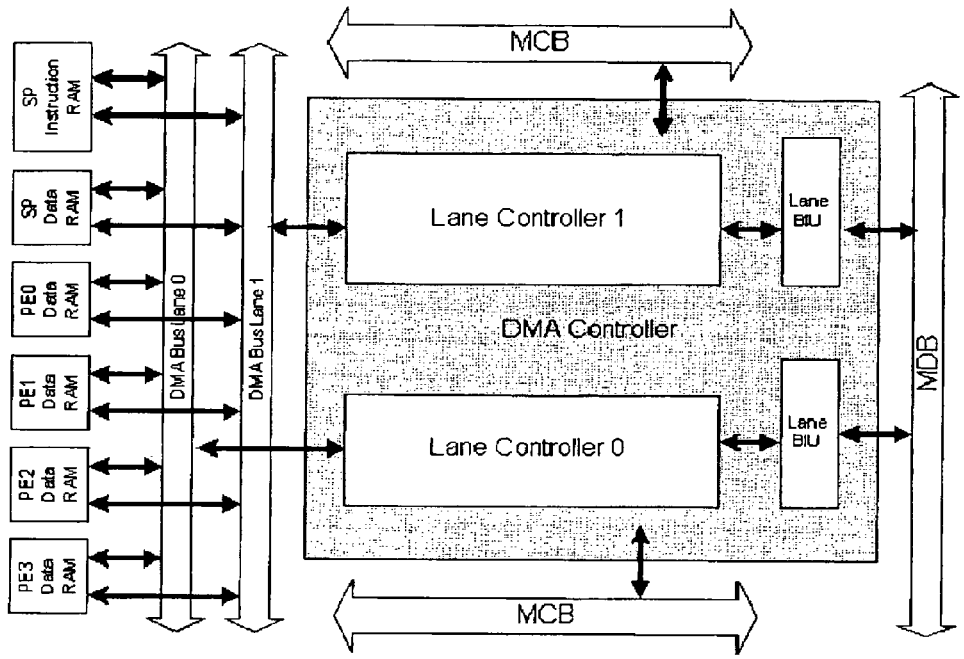

*Figure 3 DMA Controller consisting of two lane controllers*

The DMA Bus consists of two 32-bit data lanes. Each lane is a physically separate, 32-bit data path on the DMA Bus, each controlled by one of the lane controllers. SP data memory, SP instruction memory and PE data memories are each connected to both lanes of the DMA bus, allowing lane controllers independent access to each memory.

Each lane controller is also connected to the MCB where it acts as a bus slave for receiving commands from a host processor, and as a bus master for sending synchronization messages to the host processor or other MCB bus slaves.

The lane controllers are connected to the MDB by a common bus-interface unit, shared by both lane controllers.

Figure 4 shows the internal blocks of the lane controllers. Each lane controller connects to three bus interfaces: one DMA lane (either Lane 0 or Lane 1), an MCB bus interface and an MDB bus interface. Lane controllers each consist of:

- an Instruction Control Unit (ICU),
- a Command Control Unit (CCU),
- a Core Transfer Unit (CTU),
- a System Transfer Unit (STU), and
- Inbound and Outbound data FIFOs.

The CCU decodes and executes host control commands and manages communication of status messages onto the MCB.

The ICU controls fetch and decode of a transfer instruction stream.

The CTU controls data flow between a DMA Bus Lane and the FIFOs.

The STU controls data flow between the FIFOs and the DMA BIU.

Each lane controller can process one transfer (either inbound or outbound) at a time, and both lane controllers can operate independently. The overall throughput of the lane controllers is designed to match the bandwidth of the MDB.

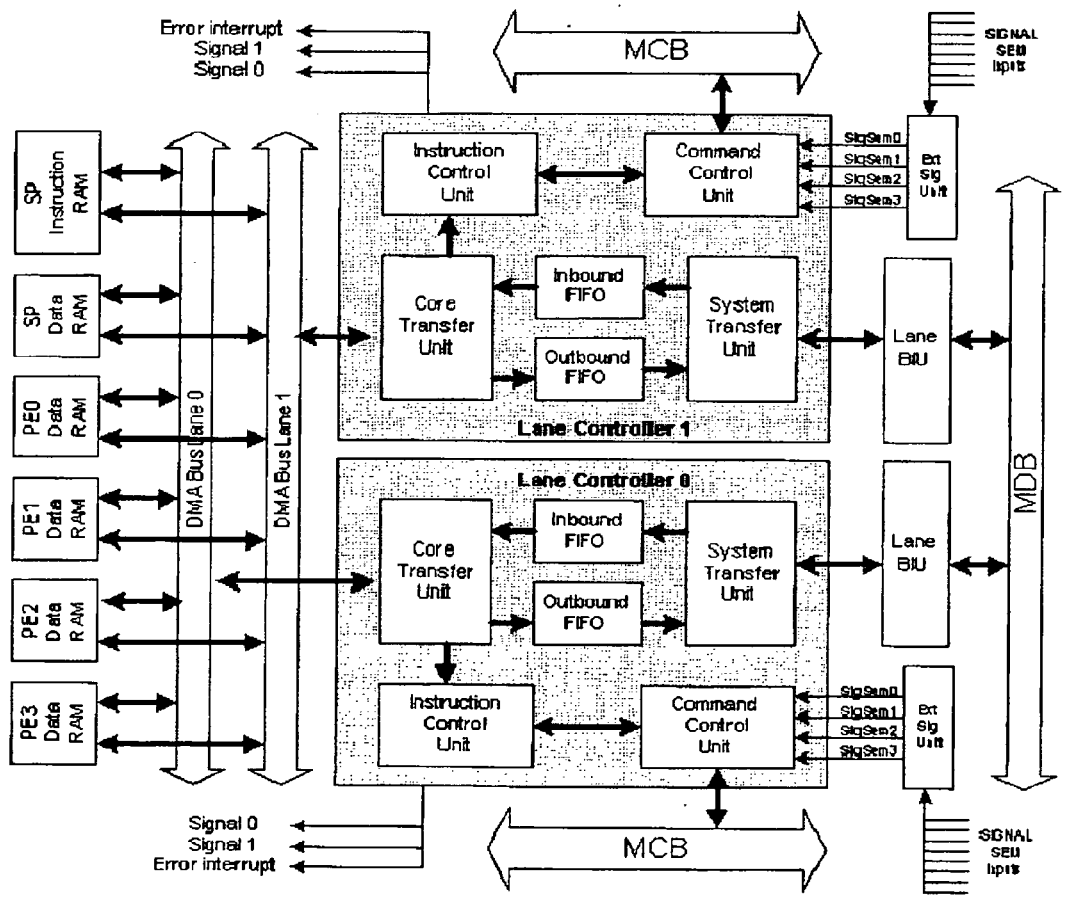

Figure 4 lane controller structure within DMA controller

2 Simple Inbound Transfer to SP Data Memory

The following figure illustrates a simple inbound transfer which moves data from an external memory device such as system memory on the AGP bus to SP Data Ram.

To effect this transfer, the System Transfer Unit (STU) continuously makes read requests on the ManArray Data Bus (MDB) to effect data transfers from the system memory on the AGP into the inbound FIFO. The STU's goal is keep the inbound FIFO full. The Core Transfer Unit (CTU) schedules write transfers on the DMA bus to move data from the inbound FIFO to the SP Data Ram. Its goal is to keep the inbound FIFO empty.

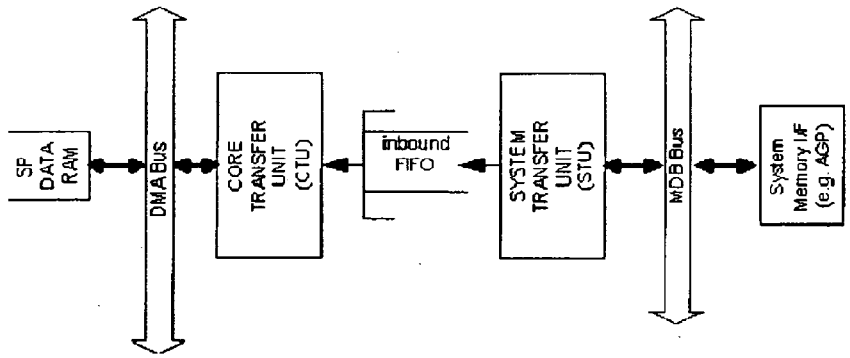

Figure 5. MANTA Core showing Inbound DMA Transfer from AGP to SP DATA RAM

The program running in the SP causes the CTU and STU to cooperatively effect this transfer. Once started, a long inbound DMA transfer can be handled without further involvement from the SP. Figure 6 illustrates two ways to effect this transfer, one using the inbound DMA transfer and the other using program synchronous SP Load instructions. SP load instructions are the most flexible way to load an arbitrary memory location into the SP, but when the SP load unit "touches" an external memory, it exposes itself to a stall condition that will cause the DSP to loose one or more full clock cycles.

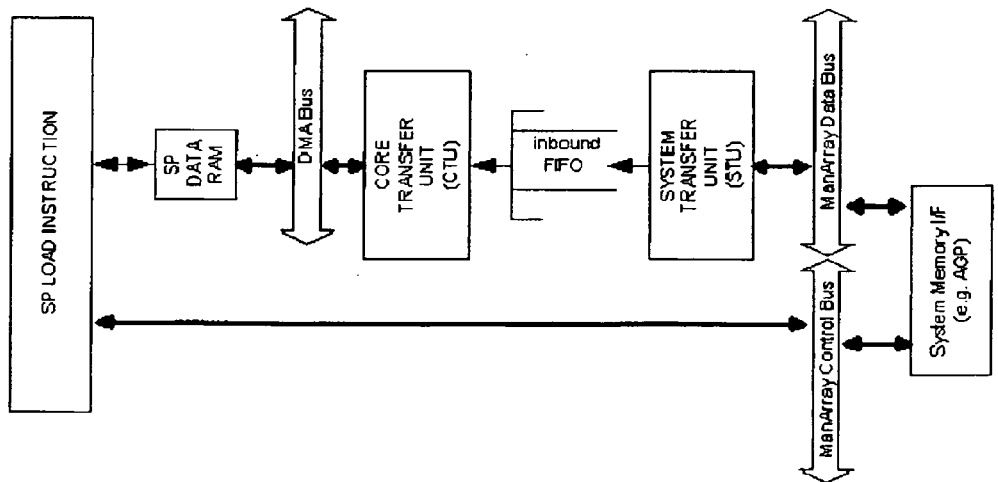

Figure 6. DMA Transfers Fully Overlap SP Load Instruction Transfers

The inbound DMA transfer does not expose the SP to uncontrolled stall conditions, but it does require a more involved initialization sequence to perform the transfer. Note that in addition to avoiding stall conditions, the DMA transfer occurs in parallel with SP execution, and without affecting the SP execution resources. Thus a DSP signal processing application runs at exactly the same time additional application data is copied into the SP Data RAM.

2.1 Simple Inbound Transfer of Program Code to the SP Instruction Memory

The fully overlapped DMA inbound transfer is used to load the next program overlay into a portion of the SP instruction RAM while the current overlay is finishing its execution in another section of the SP instruction RAM.

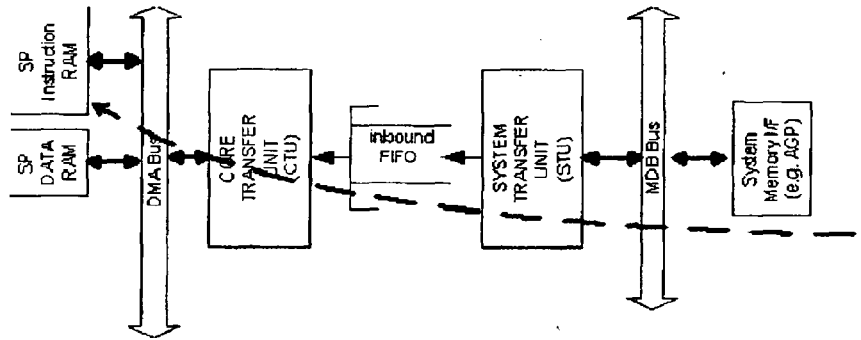

Figure 7. Using inbound DMA transfers to load a program in the SP instruction RAM

2.2 Simple Inbound Transfer of Application Data to a PE Data Memory

The inbound DMA transfer is used for continuous flow signal processing applications. For example, a continuous stream of Analog to Digital converter samples can be brought into PE data memory for a DSP application. These samples can be continuously fetched into the PE data memory without affecting the DSP algorithm's usage of the SP/PE processing resources.

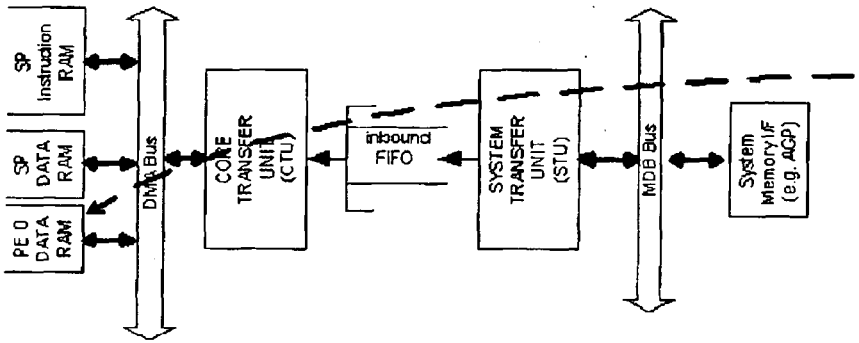

Figure 8. Using Inbound DMA Transfer to load application data into PE Data Ram

2.3 Interleaved Selection of PE Data Memory Destinations

Optimal packing of the incoming data into the PE data RAMs often involves scattering the elements of the sample vector stream among the PEs. Numerous addressing modes are provided within the DMA to effect this interleaving operation. For example, the incoming data can be scattered so that each subsequent data element is forwarded to the next sequential PE number. Various complex addressing modes can be programmed into the DMA transfer, so that incoming data can be appropriately packed into the four PE data Rams using DMA address generation and data transfer resources instead of SP/PE computation resources. Likewise, outgoing data may be gathered from the PEs in patterns that best match the characteristics of the algorithm in operation.

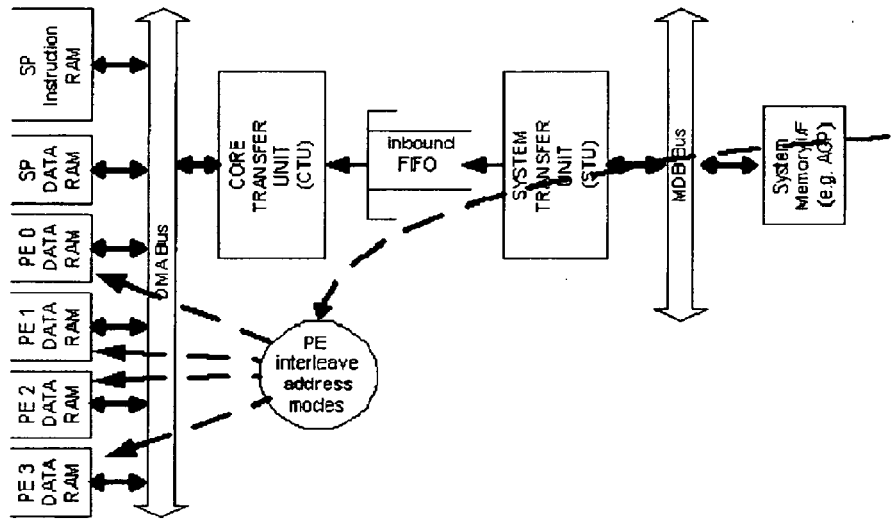

*Figure 9. PE Interleaved Address Modes*

2.4 DMA Instruction Control Unit

Each DMA lane controller is a processor in its own right. The DMA controller instruction set is distinct from the SP/PE instruction set; it is optimized for implementing memory-to-memory transfers along with transfer synchronization as targeted at DSP applications. Each DMA lane has its own instruction fetch/execute unit complete with a program counter (see Figure 10). DMA instructions are fetched over the DMA bus, typically from either the SP Data RAM or the SP Instruction RAM. DMA instructions may also reside in PE Rams There are five classes of DMA instructions:

- Transfer instructions
- Program Flow control instructions
- State control Instructions
- Modify-register instructions
- Synchronization Transfer Instructions may target either the STU or the CTU, thus two DMA instructions are used to start a complete inbound or outbound DMA transfer, with independent address generation for source and destination memories.

Program Flow Control instructions include jumps, nops and a subroutine call-return mechanism. These instructions allow autonomous instruction stream control.

State control instructions are used to restart a transfer or to clear transfer parameters from a specified transfer unit.

Modify-register instructions allow update of special registers that support address generation, message communication and conditional execution.

Synchronization instructions include SIGNAL and WAIT operations with semaphores, along with instructions for specifying events and signals and/or messages to send when they occur.

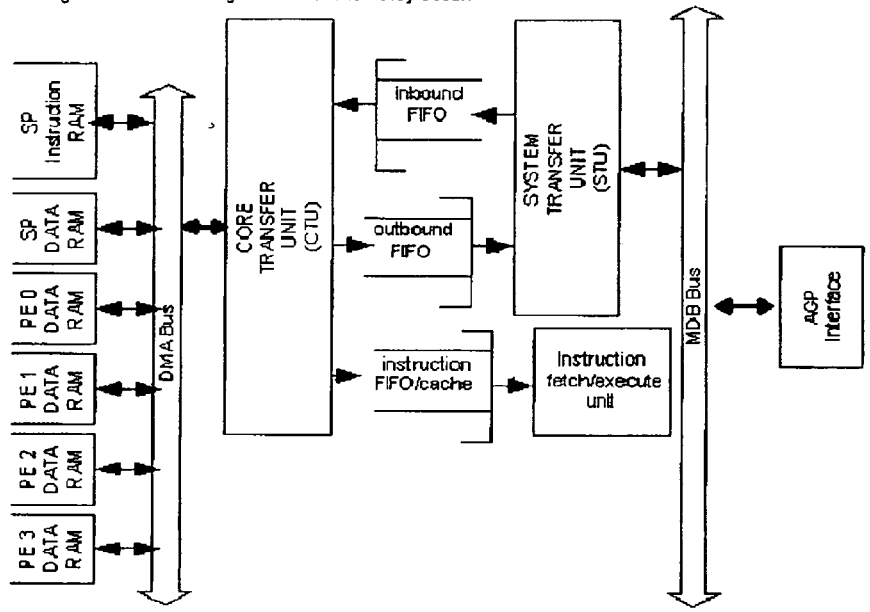

Figure 10. DMA Instruction Processor

The Instruction set includes the following types of instructions:

- Transfer System Inbound Instruction
- Transfer Core Inbound Instruction
- Transfer System Outbound Instruction
- Transfer Core Outbound Instruction
- Branch types: Jump, Call and Return (conditional, absolute and TPC-relative)
- Restart transfer Instruction
- Signal semaphore
- Wait semaphore
- Load Event/Action registers with conditions/actions
- Load GPR with an immediate value
- Load semaphores with immediate values
- Load PE address translation table
- Load bit-reversal address translation code

3 Instruction Set Overview

DMA instructions may be divided into two classes, transfer and control.

- Transfer-type instructions are executed in the Transfer Units. They move data between a memory or peripheral and an LC FIFO (either the Inbound Data Queue or IDQ, or the Outbound Data Queue or ODQ).
- Control-type instructions are executed in the ICU. They are subdivided into synchronization-type and branch-type.

A transfer program consists of a sequence of DMA instructions, and is aligned on 32-bit boundaries.

The following table shows a list of basic instruction types.

Table 1. Instruction Types

| Instruction | Operation | Description |
|---|---|---|
| TSI | Transfer System Inbound | Load control parameters for Inbound transfer from MDB to Inbound FIFO. |
| TCI | Transfer Core Inbound | Load control parameters for Inbound transfer from Inbound FIFO to a Core memory. |
| TSO | Transfer System Outbound | Load control parameters for Outbound transfer from Outbound FIFO to MDB. |
| TCO | Transfer Core Outbound | Load control parameters for Outbound transfer from Core memory to Outbound FIFO. |
| JMP | Jump (PC-relative) | Branch to a PC-relative instruction address. |
| JMPD | Jump (absolute) | Branch to an absolute transfer instruction address (32-bit). |
| CALL | Call (PC-relative) | Save current PC to the Link PC (LPC) and branch to a PC-relative instruction address. |
| CALLD | Call (absolute) | Save current PC to the Link PC (LPC) and branch to an absolute instruction address (32-bit). |
| RET | Return | Restore PC from LPC and fetch the next instruction from the restored address. |
| RESTART | Resume transfer | Reload specified Transfer Counters with their initial values and continue transfer of data (enter TRANSFER state). |
| CLEAR | Clear Transfer Unit | Set STU, CTU or both to an inactive state. |
| SIGNAL | Signal interrupt, message or semaphore | Allows general conditional signaling using interrupts, message, or semaphore updates. |
| WAIT | Wait for semaphore condition | Wait while a semaphore condition is TRUE. Provides atomic update. |
| LIMEAR | Load Event Action Registers | Load Event Action Registers with conditions to check for. When a condition is satisfied the specified signaling action(s) occur in the form of interrupts, messages and/or semaphore updates. |
| PEXLAT | Load PE Translate Table | Load PE ID translation table. This table is used during PE addressing modes to translate PE address bits. |
| LIMGR | Load Immediate General Register | Loads one or more general registers (GR0-GR3) with immediate values. |
| LIMSEM8 | Load semaphore registers | This instruction allows loading of all four semaphore registers (or any subset) with 8-bit values. |
| LIMSEM4 | Load semaphore registers | This instruction allows loading of all four semaphore registers (or any subset) with 4-bit values which may be optionally extended with either zeros or ones. |
| NOP | No operation | No operation (skip this instruction) |

Controlling DMA Transfers

Table of Contents

1 DMA Reset - Initializing the DMA Controller and Lane Controllers
2 Specifying DMA Transfer Addresses
3 Specifying Transfer Data-Type
4 Executing a DMA Transfer Program

4.1 The Transfer Program Counter and "Wait" Program Counter Registers
4.2 INITPC and WAITPC: Initializing and Enabling Instruction Fetching
4.3 Lane Controller Commands
4.4 Lane Controller Processing States 4.4.1 RESET
4.4.2 IDLE State
4.4.3 FETCH State
4.4.4 DECODE State
4.4.5 DECODE_XFER State
4.4.6 DECODE_CTRL State
4.4.7 DECODE_SIGNAL State
4.4.8 CHECK_WAITPC State
4.4.9 IWAIT State
4.4.10 EXEC_CTRL State
4.4.11 EXEC_SIGNAL State
4.4.12 EXEC_XFER State
4.4.13 SWAIT State
4.4.14 ERROR State
4.5 End-of-Transfer (EOT) and Transfer State Transition Conditions
4.5.1 Outbound Transfers: End-of-Transfer and State Transition Conditions
4.5.2 Inbound Transfers: End-of-Transfer and State Transition Conditions
4.6 SUSPEND/RESUME Commands

5 Synchronizing Host Processor(s) with Data Transfer

5.1 Lane Controller-to-Host Processor Communication 5.1.1 Internal Transfer Events and Implicit Synchronization Actions
5.1.2 Interrupt Signals
5.1.3 Message Synchronization
5.1.4 Semaphore Synchronization
5.1.5 Host Processor-to-Lane Controller Communication

6 Special Transfer Types

6.1 DMA-to-DMA and DMA-I/O DeviceTransfers 6.1.1 "Pull model" DMA-DMA (or I/O)
6.1.2 "Push model" DMA-DMA (or I/O)

6.2 Update Transfers
6.3 Bit-Reverse PE Addressing

1 DMA Reset - Initializing the DMA Controller and Lane Controllers

At power up, the DMA controller is held in the reset state by the RESETDMA bit of the DSPCTL register. In order to operate the DMA controller this bit must be cleared by software. After the RESETDMA bit has been cleared, both Lane Controllers within the DMA block are in an idle state waiting for commands to initiate their operation. Lane Controllers may be reset individually at any time by writing to the RESET address associated with the Individual Lane Controller (see the section below on Lane Controller commands). This is called a "soft reset" and takes place in one cycle. After RESET, the lane controller (or lane controllers in the case of a hard reset) is placed in the IDLE state.

2 Specifying DMA Transfer Addresses

In a typical data transfer between a core memory and a system memory (or device) residing on the MDB, two transfer instructions are used, each supplying one of the addresses. A CTU transfer instruction provides an address on the DMA Bus, specifying a core memory address. These addresses are in one of the following ranges:

| DMA BUS Memory Region | Address Range |
|---|---|
| SP Data memory | 0x00000000 - 0x00007FFF |
| SP Instruction memory | 0x00100000 - 0x00107FFF |
| PE0 Data memory | 0x00200000 - 0x00203FFF |
| PE1 Data memory | 0x00210000 - 0x00213FFF |
| PE2 Data memory | 0x00220000 - 0x00223FFF |
| PE3 Data memory | 0x00230000 - 0x00233FFF |

Note: In the case of the PE addressing modes (described in detail below), only a 16-bit address is required as an offset, since the PE selection is determined by the PE Translation Table (PEXLAT instruction) and multiple PEs are targeted with a single transfer.

An STU transfer instruction provides a system address for devices residing on the MDB. These addresses are 32-bit addresses and are system dependent. The DMA bus and system address spaces are separate for the purposes of DMA transfer addressing (e.g. address 0x00000000 represents a different physical location depending on whether it is submitted to the DMA Bus or the MDB.

System Transfer Unit (STU) Addresses for Manta are shown in the following table:

| Memory Region | Address Range |
|---|---|
| SDRAM | 0x00000000 - 0x03FFFFFF |
| FLASH ROM | 0x04000000 - 0x07FFFFFF |
| PCI Bus Window | 0x08000000 - 0x0BFFFFFF |
| MPB Window | 0x0C000000 - 0x0FFFFFFF |
| Manta I/O | 0x10000000 - 0x10FFFFFF |
| MDB DMA Slaves | 0x11000000 - 0x13FFFFFF |
| PCI | 0x14000000 - 0xFFFFFFFF |

Important Note: Addresses are always assumed to be byte addresses even though the smallest data type supported for Manta is 32-bits. Therefore the least significant two bits of all memory addresses used as the source or destination of data transfers should be zero. On the other hand, addresses used to specify messages sent on the MCB (e.g. SIGNAL instructions) may be aligned to any byte address.

3 Specifying Transfer Data-Type

For the Manta core, the transfer data type is always assumed to be "32-bit word".

4 Executing a DMA Transfer Program

When a Lane Controller comes out of its reset state, it is placed in the IDLE state. In order to start a program, the program counter must be initialized to the start of a list of DMA instructions, and then enabled for fetching. Instruction execution depends on the current Lane Controller state, on commands sent to the Lane controller over the MCB, and on the instructions themselves. The following sections describe the commands, registers, states of operation and instructions used for program flow control.

4.1 The Transfer Program Counter and "Wait" Program Counter Registers

There are two primary registers used to control program flow:

- the Transfer Program Counter (TPC), and
- the Wait Program Counter (WAITPC).

Whenever these two registers contain the same value, the processor enters (or remains in) a "waiting" or paused state. No further instructions are decoded until the WAITPC differs from the TPC. The WAITPC acts as a fence, preventing further instructions from being executed. Since the order of transfer requests in an application program may not be static (tasks request transfers at varying times) the DMA instruction list can be built dynamically. The WAITPC allows a block of instructions to be processed while placing new requests ahead of the WAITPC address, preventing the instruction fetching from overtaking the placement of new instructions into the stream.

The following figure illustrates this:

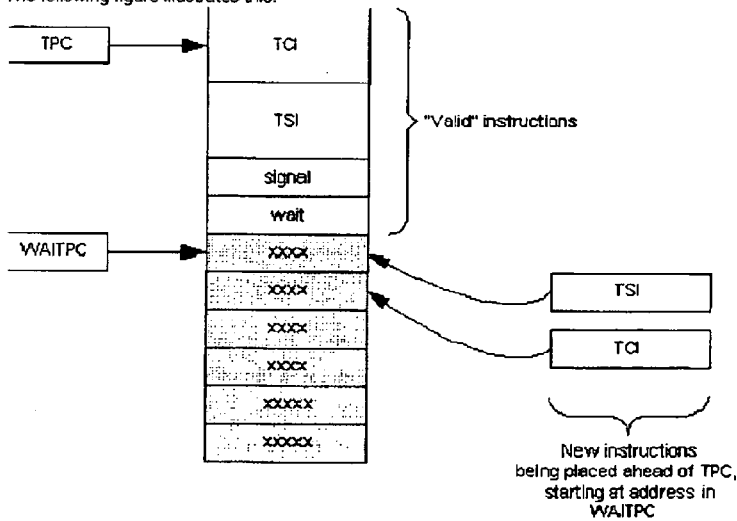

*Figure 1. Using WAITPC to "Validate" a block of DMA Instructions for Execution*

4.2 INITPC and WAITPC: Initializing and Enabling Instruction Fetching

The TPC is initialized by writing a program address to the INITPC register or directly to the TPC register. Writing an instruction address to the INITPC register causes both the TPC and WAITPC registers to be initialized to the value written. When the Lane Controller is in the IDLE state, both TPC and WAITPC have the same value. Writing to INITPC maintains this condition. A second write to the WAITPC register, with a different instruction address, allows program fetching to begin. Whenever WAITPC is not equal to TPC, the Lane Controller is enabled to fetch and execute instructions.

It is possible to enable program fetching by writing to the TPC directly. This allows instruction fetching to begin immediately (if WAITPC differs from TPC after the write). If this is done, it is best to make sure that all memory ahead of the TPC contains valid DMA instructions. The last valid DMA instruction, in this case should either cause fetching to stop (a WAIT -type instruction) or branch to a previous instruction. The use of the WAITPC allows a block of instructions to be validated without requiring a flow-control instruction in the program.

4.3 Lane Controller Commands

Lane Controller commands are control operations that are initiated by any MCB bus master by writing to or reading from specific lane controller "command" addresses.

For example, INITPC is a command that requires data to be written to the INITPC address. The RESET command is initiated by writing any data value to the RESET address. Several commands are initiated only by writing to (or reading from) particular addresses. These "address-only" commands are an efficient way to initiate some control operations, since they require less overhead on the part of an MCB bus master. Some commands may target either the STU or the CTU or both.

Most commands are accepted only when a lane controller is in certain states. When a command is received while processing in a state for which it is not valid, the command is ignored. (States may be tracked by reading the TSRx registers, bits [15:12], which indicate processing state.)

The following table describes the Lane Controller commands.

| Name | Description |
|---|---|
| RESET | Address-only command. Writing any value to this address causes the Lane Controller to reset itself to an IDLE state in which TPC = WAITPC = 0x00000000, all errors are cleared, STU and CTU are cleared to an inactive state, and any transfer in progress is terminated. The Lane Controller's inbound and outbound FIFOs are cleared, and the LMIU FIFOs associated with the Lane Controller are cleared. Registers are reset to their initial values. |
| INITPC | Writing a (32-bit) value to this address loads the TPC AND the WAITPC with the same value. Since TPC and WAITPC are equal, instructions are not fetched. Whenever WAITPC is updated (either directly or via the INITPC command) the LOCK value is cleared to zero. |
| SUSPEND | Address-only command. A write operation (any data) to this register causes any active transfer to SUSPEND activity and retain its state. The requesting transfer unit stops requesting, and the SUSPEND becomes effective after all data in the DMA pipeline has flushed to the destination. (SUSPEND may take several cycles to complete). If received while fetching and decoding an instruction, instruction SUSPENDs after executing the current instruction if it is a control type instruction, and SUSPENDs after entering the transfer state if it is a transfer-type instruction (without moving any data). |
| RESUME | Address-only command. A write to this address allows instruction fetching or data transfer to resume after being paused by a SUSPEND command. Lane controller processing is continued from where it left off prior to receiving a SUSPEND command. |
| RESTART | Address-only command. A write to this address causes the currently READY transfer unit(s) to restart. An active transfer unit which has a zero transfer count is reinitialized with its initial transfer count (from ITCNT register). If both CTC and STC are zero, then both are reloaded. Once either (or both) is reloaded the transfer resumes from the next source/destination addresses (as if the transfer were continuing from where it stopped). |
| RESTARTSTU | Address-only command. A write to this address causes the STU to reload its initial count (if the current count is zero) and continue transferring data using the current STU transfer parameters. |
| RESTARTCTU | Address-only command. A write to this address causes the CTU to reload its initial count (if the current count is zero) and continue transferring data using the current CTU transfer parameters. |

| | |
|---|---|
| CLEAR | Address-only command. A write to this address causes the STU and CTU transfer parameters to be cleared. Once cleared, transfer parameters must be reloaded by fetching new transfer instructions, and RESTART commands will have no effect. |
| CLEARSTU | Address-only command. A write to this address causes the STU transfer parameters to be cleared. Once cleared, transfer parameters must be reloaded by fetching a new STU transfer instruction, and RESTART commands will have no effect. |
| CLEARCTU | Address-only command. A write to this address causes the CTU transfer parameters to be cleared. Once cleared, transfer parameters must be reloaded by fetching a new CTU transfer instruction, and RESTART commands will have no effect. |
| INITSTC | Writing a value to this address updates both ISTC (initial system transfer count) and STC (system transfer count). |
| INITSTC_START | Writing a value to this address updates both ISTC and STC and also causes a RESTART command. |
| INITCTC | Writing a value to this address updates both ICTC (initial core transfer count) and CTC (core transfer count). |
| INITCTC_START | Writing a value to this address updates both ICTC and CTC and initiates a RESTART command. |
| WRITESTC | Writing a value to this address updates only STC. |
| WRITESTC_START | Writing a value to this address updates STC and initiates a RESTART command. |
| WRITECTC | Writing a value to this address updates only CTC. |
| WRITECTC_START | Writing a value to this address updates CTC and initiates a RESTART command. |
| LOCK0 - LOCK7 | There are 8 specific addresses (LOCK0 - LOCK7) which may be used by multiple tasks/processors for mutual exclusive access to the WAITPC, so that each may add instructions to the Lane controller's transfer program (after the current WAITPC) without interference. Each of up to 8 MCB masters (usually processors or tasks) which seek to append DMA instructions to the DMA instruction list are assigned a LOCK address. A read from to LOCKx returns either 0x00000000 (unlocked and available) or 0x00000001 (locked, not available). When a bus master's read from LOCKx returns 0, it may append instructions starting at WAITPC. When it is finished it updates WAITPC to point to 1 location beyond its last instruction. The act of writing WAITPC releases the lock, making available to other MCB masters. |
| UWAITS0 - UWAITS3 | A read from any of these addresses returns zero if the corresponding semaphore value is zero. If the value is not zero, the current value is returned and the semaphore is decremented by 1 atomically. |
| SWAITS0 - SWAITS3 | A read from any of these addresses returns zero if the corresponding semaphore value is less than or equal to zero (the semaphore is treated as a signed number). If the value is greater than zero, the value is returned and the semaphore is decremented by 1 atomically. |
| INCS0 - INCS3 | A write to any of these addresses (same addresses as UWAITS0 - UWAITS3) causes the corresponding semaphore to be incremented atomically. |
| DECS0 - DECS3 | A write to any of these addresses (same addresses as SWAITS0 - SWAITS3) causes the corresponding semaphore to be decremented atomically. |

4.4 Lane Controller Processing States

At any given time a Lane Controller operates in one of the following global states:

- IDLE
- FETCH
- DECODE
- TPCWAIT
- DECODE_SIGNAL
- IWAIT
- DECODE_XFER
- DECODE_CTRL
- SWAIT
- ERROR
- XFLUSH

- EXEC_SIGNAL
- EXEC_XFER
- EXEC_CTRL

These states are called "global" because they encompass the states of both the STU and CTU and actually consist of multiple substates. The following sections describe each state and how commands affect the Lane controller when in those states.

Note: Those commands which update the LOCKID register, and the SEM register (semaphore update commands) do not directly affect transfer state and are not shown in the command tables in the following sections.

4.4.1 RESET

RESET is not a state, but rather an event. It is documented here since a RESET may occur while in any state. In general, the following operations take place at RESET (either soft or hard).

- TPC and WAITPC are initialized to 0x00000000 (start of SP Data memory)
- IDQ and ODQ FIFOs are set to EMPTY
- LMIU FIFOs (FIFOs at each memory interface for the lane) are set to EMPTY
- Semaphore register is cleared to zero
- General Registers are not initialized (values are unspecified)
- STU and CTU are set inactive (no valid transfer parameters loaded)
    - STC = CTC = 0
    - STACTIVE = TCACTIVE = 0
    - TCNT = 0
    - Save TSRx Register
- Lane controller state is set to IDLE.

Other register reset values are documented below where registers are described in detail.

4.4.2 IDLE State

The IDLE state is entered after a hard or soft RESET has been executed or when an INITPC command has been processed (which invalidates the current instruction buffer).

Effect of Commands in IDLE

| Command/Action | Effect when in IDLE state |
|---|---|
| RESET | Next state is IDLE. A write of any data to this address resets lane controller. |
| INITPC | Next state is IDLE. Load TPC and WAITPC with value written to INITPC address. Clear LOCK flag (associated with LOCKID addresses) |
| Write to WAITPC | `if (TPC != WAITPC)`<br>    `next state is FETCH`<br>`else`<br>    `next state is IDLE`<br>`Clear LOCK flag (associated with LOCKID addresses)` |
| Write to TPC | `if (TPC != WAITPC)`<br>    `next state is FETCH`<br>`else`<br>    `next state is IDLE`<br>`Clear LOCK flag (associated with LOCKID addresses)` |
| SUSPEND | `Next state is SWAIT.` |

| Command/Action | Effect when in state |
|---|---|
| RESTART | If both STU and CTU contains valid transfer parameters<br>    if(STC == 0)<br>        STC _ ISTC<br>    if(CTC == 0)<br>        CTC _ ICTC<br>    next state is EXEC_XFER<br>else<br>    next state is current state |
| RESTARTSTU | If both STU and CTU contain valid transfer parameters<br>    if(STC == 0)<br>        STC _ ISTC<br>    if(STC != 0 && CTC != 0)<br>        next state is EXEC_XFER<br>    else<br>        next state is current state<br>else<br>    next state is current state |
| RESTARTCTU | A write of any data to this address does the following:<br><br>If both STU and CTU contain valid transfer parameters<br>    if(CTC == 0)<br>        CTC _ ICTC<br>    if(STC != 0 && CTC != 0)<br>        next state is EXEC_XFER<br>    else<br>        next state is current state<br>else<br>    next state is current state |
| CLEAR | No state change. Invalidate both STU and CTU transfer parameters (place them in an inactive state) |
| CLEARSTU | No state change. Invalidate STU transfer parameters. |
| CLEARCTU | No state change. Invalidate CTU transfer parameters. |
| INITSTC | Value written to this address is used to initialize ISTC and STC. |
| INITSTC_START | Value written to this address is copied to both ISTC and STC, then RESTART transfer (same logic as above) |
| INITCTC | Next state is IDLE. Value written to this address is used to initialize ICTC and CTC. |
| INITCTC_START | Value written to this address is copied to both ICTC and CTC, then RESTART transfer (same logic as above) |
| WRITESTC | Next state is IDLE. Value written to this address updates STC only. |
| WRITESTC_START | Value written to this address STC only, then RESTART transfer (same logic as above) |
| WRITECSTC | Next state is IDLE. Value written to this address updates CTC only. |
| WRITECTC_START | Value written to this address CTC only, then RESTART transfer (same logic as above) |

4.4.3 FETCH State

The FETCH state is a transition state, entered when a new buffer of instructions is read. When the buffer is refilled the DECODE state is entered.

Effect of Commands in FETCH State

| Command/Action | Effect when in state |
|---|---|
| RESET | Next state is RESET. |
| SUSPEND | Sets internal "suspend pending" status. Actual SUSPEND does not take effect until CHECKTPC state is entered. |

4.4.4 DECODE State

In the DECODE state, the lane controller reads an instruction from the instruction buffer and determines its type. If the instruction is recognized, then one of the other decode states is entered (see following) and if not recognized the ERROR state is entered.

Effect of Commands in DECODE State

| Command/Action | Effect when in state |
|---|---|
| RESET | Next state is RESET. |
| SUSPEND | Sets internal "suspend pending" status. Actual SUSPEND does not take effect until CHECKTPC state is entered. |

4.4.5 DECODE_XFER State

In the DECODE_XFER state transfer instruction parameters are loaded into the specified transfer unit (either the CTU or STU).

Effect of Commands in DECODE_XFER State

| Command/Action | Effect when in state |
|---|---|
| RESET | Next state is RESET. |
| SUSPEND | Sets internal "suspend pending" status. Actual SUSPEND does not take effect until CHECKTPC state is entered. |

4.4.6 DECODE_CTRL State

In the DECODE_CTRL state, control type instructions are decoded and/or executed (if they only require a single cycle). Branch type instructions will result cause a transition to the FETCH state to reload the instruction buffer (Manta).

Effect of Commands in DECODE_CTRL State

| Command/Action | Effect when in state |
|---|---|
| RESET | Next state is RESET. |
| SUSPEND | Sets internal "suspend pending" status. Actual SUSPEND does not take effect until CHECKTPC state is entered. |

4.4.7 DECODE_SIGNAL State

In the DECODE_SIGNAL state the lane controller processes SIGNAL instructions which can require MCB bus master access (for messages)

Effect of Commands in DECODE_SIGNAL State

| Command/Action | Effect when in state |
|---|---|
| RESET | Next state is RESET. |
| SUSPEND | Sets internal "suspend pending" status. Actual SUSPEND does not take effect until CHECKTPC state is entered. |

4.4.8 CHECK_WAITPC State

The CHECK_WAITPC state is entered after every Instruction is executed to determine if TPC is equal to WAITPC. If they are not equal, then the next instruction is decoded and executed. If they are equal then this state is reentered until they are made unequal (through an external command update of WAITPC or INITPC or write to TPC).

| Command/Action | Effect when in IDLE state |
|---|---|
| RESET | Next state is IDLE. A write of any data to this address resets lane controller. |
| INITPC | Next state is IDLE. Load TPC and WAITPC with value written to INITPC address. Clear LOCK flag (associated with LOCKID addresses) |
| Write to WAITPC | ```
if (TPC != WAITPC)
    if instruction words are available in buffer
        next state is DECODE
    else
        next state is FETCH
Clear LOCK flag (associated with LOCKID addresses)
``` |
| Write to TPC | ```
if (TPC != WAITPC)
    if instruction words are available in buffer
        next state is DECODE
    else
        next state is FETCH
Clear LOCK flag (associated with LOCKID addresses)
``` |
| SUSPEND | Next state is SWAIT. |
| RESTART | ```
If both STU and CTU contains valid transfer parameters
    if(STC == 0)
        STC _ ISTC
    if(CTC == 0)
        CTC _ ICTC
    next state is EXEC_XFER
else
    next state is current state
``` |
| RESTARTSTU | ```
If both STU and CTU contain valid transfer parameters
    if(STC == 0)
        STC _ ISTC
    if(STC != 0 && CTC != 0)
        next state is EXEC_XFER
    else
        next state is current state
else
    next state is current state
``` |
| RESTARTCTU | ```
If both STU and CTU contain valid transfer parameters
    if(CTC == 0)
        CTC _ ICTC
    if(STC != 0 && CTC != 0)
        next state is EXEC_XFER
    else
        next state is current state
else
    next state is current state
``` |
| CLEAR | Invalidate both STU and CTU transfer parameters (place them in an inactive state). |
| CLEARSTU | Invalidate STU transfer parameters. |
| CLEARCTU | Invalidate CTU transfer parameters. |
| INITSTC | No state change. Value written to this address is used to initialize ISTC and STC. |
| INITSTC_START | Value written to this address is copied to both ISTC and STC, then initiate RESTART |
| INITCTC | No state change. Value written to this address is used to initialize ICTC and CTC. |
| INITCTC_START | Value written to this address is copied to both ICTC and CTC, then initiate RESTART |

| | |
|---|---|
| WRITESTC | No state change. Value written to this address updates STC only. |
| WRITESTC_START | Value written to this address STC only, then initiate RESTART |
| WRITECSTC | No state change. Next state is IDLE. Value written to this address updates CTC only. |
| WRITECTC_START | Value written to this address CTC only, then initiate RESTART |

4.4.9 IWAIT State

The IWAIT state is entered when a WAIT instruction is decoded and it's specified condition is TRUE.

| Command/Action | Effect when in IDLE state |
|---|---|
| RESET | Next state is IDLE. A write of any data to this address resets lane controller. |
| INITPC | Next state is IDLE. Load TPC and WAITPC with value written to INITPC address.<br>Clear LOCK flag (associated with LOCKID addresses) |
| Write to WAITPC | No state change. WAITPC is updated.<br>Clear LOCK flag (associated with LOCKID addresses) |
| Write to TPC | No immediate state change.<br>When WAIT condition becomes false, next state is FETCH (since a change in TPC invalidates the instruction buffer).<br>Clear LOCK flag (associated with LOCKID addresses) |
| SUSPEND | Next state is SWAIT. |
| RESTART | If both STU and CTU contains valid transfer parameters<br>    if(STC == 0)<br>        STC _ ISTC<br>    if(CTC == 0)<br>        CTC _ ICTC<br>    next state is EXEC_XFER<br>else<br>    next state is current state |
| RESTARTSTU | If both STU and CTU contain valid transfer parameters<br>    if(STC == 0)<br>        STC _ ISTC<br>    if(STC != 0 && CTC != 0)<br>        next state is EXEC_XFER<br>    else<br>        next state is current state<br>else<br>    next state is current state |
| RESTARTCTU | If both STU and CTU contain valid transfer parameters<br>    if(CTC == 0)<br>        CTC _ ICTC<br>    if(STC != 0 && CTC != 0)<br>        next state is EXEC_XFER<br>    else<br>        next state is current state<br>else<br>    next state is current state |
| CLEAR | Invalidate both STU and CTU transfer parameters (place them in an inactive state). |
| CLEARSTU | Invalidate STU transfer parameters. |
| CLEARCTU | Invalidate CTU transfer parameters. |
| INITSTC | No state change. Value written to this address is used to initialize ISTC and STC. |
| INITSTC_START | Value written to this address is copied to both ISTC and STC, then initiate RESTART |
| INITCTC | No state change. Value written to this address is used to initialize ICTC and CTC. |
| INITCTC_START | Value written to this address is copied to both ICTC and CTC, then initiate RESTART |

| | |
|---|---|
| WRITESTC | No state change. Value written to this address updates STC only. |
| WRITESTC_START | Value written to this address STC only, then initiate RESTART |
| WRITECSTC | No state change. Next state is IDLE. Value written to this address updates CTC only. |
| WRITECTC_START | Value written to this address CTC only, then initiate RESTART |

4.4.10 EXEC_CTRL State

The EXEC_CTRL state is entered with a control-type instruction is detected in decode. In this state the control type instruction is executed and the TPC value is updated according to the instruction type. If the instruction is of branch-type and any condition specified is TRUE, then the TPC is updated with the branch target address.

Effect of Commands in EXEC_CTRL

| Command/Action | Effect when in state |
|---|---|
| RESET | Next state is RESET. |
| SUSPEND | Sets internal "suspend pending" status. Actual SUSPEND does not take effect until CHECKTPC state is entered. |

4.4.11 EXEC_SIGNAL State

The EXEC_SIGNAL state is entered when decoding a multi-word SIGNAL instruction since it may require an MCB bus master operation.

Effect of Commands in EXEC_SIGNAL

| Command/Action | Effect when in state |
|---|---|
| RESET | Next state is RESET. |
| SUSPEND | Sets internal "suspend pending" status. Actual SUSPEND does not take effect until CHECKTPC state is entered. |

4.4.12 EXEC_XFER State

The EXEC_XFER state is entered in the following ways:

- From DECODE_XFER when a transfer-type instruction is detected
- From IDLE, IWAIT, and CHECK_WAITPC when a RESTART command is received and there are valid parameters in the STU and CTU.
- From SWAIT when a RESUME command is received and the previous state was EXEC_XFER.

This state is the global state that is in effect when a transfer is in progress. During this state the STC and CTC values are updated based on words transferred to/from the MDB or to/from the DMA Bus respectively.

Effect of Commands in EXEC_XFER

| Command/Action | Effect when in state |
|---|---|
| RESET | Next state is RESET. |
| SUSPEND or suspend-pending | Stops source request and initiates flushing of DMA data pipeline. IF EOT condition asserted while flushing data pipeline |

|  | Next state is CHECK_WAITPC<br>else<br>　　Next state is SWAIT |
|---|---|

4.4.13 SWAIT State

The SWAIT state is entered after a SUSPEND command has been received and commands or transfers in progress have been completed or paused. This state may only be left by receiving a RESUME command or a RESET.

Effect of Commands in SWAIT State

| Command/Action | Effect when in state |
|---|---|
| RESET | Next state is RESET. |
| RESUME | Causes lane controller to exit SWAIT state and return to the state in which it was operating prior to handling the SUSPEND command. |

4.4.14 ERROR State

The ERROR state is entered when an invalid instruction has been decoded by the lane controller. The only means of leaving the error state is to issue a RESET to the lane controller (hard or soft).

Effect of Commands in ERROR State

| Command/Action | Effect when in state |
|---|---|
| RESET | Next state is RESET. |

4.5 End-of-Transfer (EOT) and Transfer State Transition Conditions

Once a transfer has been started there must be some means for the host processor to know when the transfer has completed or reached some "point of interest". These "points of interest" correspond to internal transfer conditions which may be checked and which may then be used to generate signaling actions back to the host processor(s). Each Lane Controller tracks the following conditions:

- When TPC == WAITPC
- When CTU has transferred the requested number of elements
- When STU has transferred the requested number of elements
- When both CTU and STU have transferred the requested number of elements The "TPC == WAITPC" condition is checked during CHECK_WAITPC and causes fetching to pause while the condition is true. While in the EXEC_XFER state a Lane controller uses two transfer counters, the System Transfer Count (STC) and the Core Transfer Count (CTC). The STC contains the number of data elements to be transferred from (inbound) or to (outbound) the MDB. The CTC contains the number of data elements to be transferred from (outbound) or to (inbound) the DMA Bus.

The main criteria for determining end-of-transfer (EOT) is that either of the transfer counters has reached zero AND all data in the transfer path has been flushed to the destination (FIFOs are empty, etc.). When an EOT condition is detected the Lane Controller transitions to the CHECK_WAITPC state. If programmed to do so, the EOT condition can be signalled to one or more host processors using either a direct interrupt signal (wire) or by sending a message on the MCB. The manner in which STC and CTC are decremented and EOT is determined depends on whether the transfer is inbound or outbound.

4.5.1 Outbound Transfers: End-of-Transfer and State Transition Conditions

For outbound transfers the EOT condition occurs when (STC or CTC reaches zero) AND the ODQ FIFO is empty AND the MDB master is idle.

4.5.2 Inbound Transfers: End-of-Transfer and State Transition Conditions

For inbound transfers the EOT condition occurs when (STC or CTC reaches zero) AND the IDQ FIFO is empty AND the ReqFIFOEmpty signal is asserted (all data has been written to core memory).

4.6 SUSPEND/RESUME Commands

The SUSPEND and RESUME commands provide a means for pausing and restarting a lane controller without affecting its transfer parameters. If a transfer is in progress the following sequence takes place:

- Stop requesting data in the source transfer unit (STU for Inbound transfers, CTU for outbound transfers)
- All outstanding requests are allowed to reach appropriate data FIFO
- Destination transfer unit empties FIFO by generating write request to destination bus (STU for outbound and CTU for inbound transfers). The destination transfer unit simply waits for more data to appear in the FIFO.
- If either transfer unit exhausts its transfer count while flushing the data pipeline, then the EOT condition is set.
- When the data pipeline is flushed, if the EOT condition has not been asserted the processor enters the SWAIT state. If the EOT condition has been asserted, then the Lane controller enters the CHECK_WAITPC state.

If a RESUME command is received and the processor is in the SWAIT state, then the source transfer unit begins requesting data from where it left off prior to the SUSPEND command and the destination transfer unit continues emptying the FIFO.

If no transfer is in progress when a SUSPEND command is received, any instruction which is currently in decode completes its execution and the SWAIT state is entered. If a transfer instruction is in DECODE, its parameters are loaded, and on entry to the EXEC_XFER state the suspend-pending condition is detected resulting in an immediate transition to the SWAIT state. In any of the cases, a state variable is used to return to the appropriate state when a RESUME command is received.

5 Synchronizing Host Processor(s) with Data Transfer

In many applications, synchronization of host processing with data transfer requires the following:

- Data transferred from the source buffer must be valid (that is, the transfer engine cannot be allowed to overtake the producer of data). In other words, avoid underflow conditions at the source.
- Data transferred to the destination cannot overwrite unprocessed data (the transfer engine cannot be allowed to overtake the consumer of data). In other words avoid overflow at the destination.
- The control necessary to prevent underflow and overflow at the source and destination respectively should incur minimal overhead in the source and destination processors, and to a lesser extent the transfer engine (whose function is to hide transfer latency).

There are several synchronization mechanisms available which allow these requirements to be met for each Lane controller. These mechanisms will be described by the direction of control flow, either Lane controller-to-host processor or host-processor-to-Lane controller.

5.1 Lane Controller-to-Host Processor Communication

Lane controllers can communicate events to host processors using any of three basic mechanisms:

- Interrupt signals
- Messages
- Semaphores

Each of these mechanisms may be operated in an explicit or an implicit fashion. Explicit operation refers to the operation being carried out by a DMA instruction. Implicit operation refers to the operation being carried out in response to an internal event (after being configured to do so). The following sections discuss explicit and implicit synchronization actions and the instructions/commands associated with them.

5.1.1 Internal Transfer Events and Implicit Synchronization Actions

There are basically four different internal "transfer events" which may be selected to cause an associated action:

(1) CTU reaches end-of-transfer condition
(2) STU reaches end-of-transfer condition
(3) CTU && STU reach end-of-transfer condition
(4) TPC becomes equal to WAITPC The end-of-transfer condition occurs in a unit when the number of data elements read or written by the particular unit is equal to the requested transfer count for that unit AND the data FIFO has flushed to the destination of the transfer.

Each time one of these events occurs an associated action can be performed if enabled. The selection and enabling of these actions may be done using the LIMEAR instruction or by loading the Event/Action registers, EAR0 and EAR1 directly. The LIMEAR instruction allows the EAR0 and EAR1 registers to be loaded, and specifies actions to be associated with specified internal events. LIMEAR is used to program operations to be associated with internal events. The actions which may be performed when an event from the above list occurs are:

- Assert interrupt signal 0, and/or
- Assert interrupt signal 1, and /or
- Send message: (and/or)
    o using immediate address and immediate data (immediate: contained in instruction), or
    o using indirect address (found in one of the general register GR0-GR3) and immediate data, or
    o using immediate address and indirect data (found in one of the system registers including GR0-GR3, TSR0-TSR3, SEM, and TPC, or
    o using indirect address and indirect data
- Update semaphore S0: no change, increment, decrement or clear, and/or
- Update semaphore S1: no change, increment, decrement or clear, and/or
- Update semaphore S2: no change, increment, decrement or clear, and/or
- Update semaphore S3: no change, increment, decrement or clear In addition a special restart semaphore event-action pair may be specified when an EOT condition occurs (either CTUeot or STUeot)

- When CTUeot occurs the specified semaphore is compared to zero. If the specified semaphore value is greater than zero then the CTU restarts its current transfer automatically (reloading its initial transfer count), and decrements the semaphore.
- When STUeot occurs the specified semaphore is compared to zero. If the specified semaphore value is greater than zero then the STU restarts its current transfer automatically (reloading its initial transfer count), and decrements the semaphore.

Using the available operations, the Lane controller can signal one or two processors, notifying them of the same internal event, or of different events.

5.1.2 Interrupt Signals

There are two interrupt signals available to each Lane controller. These may be used as inputs to processor interrupt controllers. Explicit assertion of these signals may be carried out using the SIGNAL instruction. When an interrupt signal is asserted, it becomes active high for 2 clock cycles, then returns to an inactive low state. Implicit assertion of an interrupt signal may be configured through use of the LIMEAR instruction or writing to the EAR0 and EAR1 registers.

5.1.3 Message Synchronization

A message is simply a single 32-bit transfer, copying a value from the Lane controller to a specified address with specified data to a device on the MCB. Explicit message communication can be carried out using the SIGNAL instruction. Messages may also be sent as a result of detecting an internal event (such as a transfer count becoming zero) by programming the EAR0 and EAR1 (event-action) registers.

5.1.4 Semaphore Synchronization

There are four 8-bit hardware semaphores which may be updated and monitored by both the Lane controller and host processors in an atomic fashion. The SIGNAL instruction is conditionally executed based on a semaphore value and may in addition update another of the semaphores. The WAIT instruction is used to atomically read-and-optionally-update the semaphore based on its value. Two of the semaphores may be used to support synchronization at the source-end of a transfer and two may be used to support synchronization at the destination-end of the transfer.

5.1.5 Host Processor-to-Lane Controller Communication

Host processors can communicate with the Lane controller using either commands (writes to special addresses), register updates (writes with specific data), or discrete signals (usually from an I/O block). In addition host processors can update the Lane controllers instruction flow by using the WAITPC register to break transfer programs into blocks of transfers. Multiple hosts can use the same DMA Lane controller, updating its instruction stream by using the LOCKID register and associated command addresses to implement mutual-exclusive access to the WAITPC. Semaphore commands may be used to both signal and wait on a semaphore. Particular access addresses are used to allow these operations to be performed in once bus transfer (either a read or a write). Specific register updates (such as writing to the transfer count registers) can be used to restart a transfer. A list of operations that a host processor can perform follows:

- Reset Lane controller
- Write to the INITPC register
- Write to TPC register
- Execute a "wait" operation on a semaphore (read SWAIT or UWAIT address)
- Execute a "signal" operation on a semaphore (write the INCSx or DECSx address, or assert one of the SIGNALSEMx input wires)
- Read from the LOCKx register (to acquire a software lock for accessing WAITPC)
- Write to the WAITPC to allow instruction processing to advance
- Write to CTC to update transfer count with optional auto-restart.
- Write to STC to update transfer count with optional auto-restart.
- Suspend, resume, restart transfers The SIGNALSEMx wires are a set of 4 signals per Lane Controller which are associated with a Lane Controller's semaphore registers. A 1-cycle pulse on SIGNALSEMx causes SEMx to be incremented by 1. If this signal is asserted on exactly the same cycle as a Lane Controller is executing a WAIT operation on the same semaphore, then the semaphore is not updated by either operation, and both operations complete as if their respective updates occurred normally.

6 Special Transfer Types

6.1 DMA-to-DMA and DMA-I/O DeviceTransfers

Each lane controller supports an MDB-slave address range which may be used to directly read and write from/to the corresponding ODQ or IDQ when the lane's STU is in an inactive state. For example, a DMA transfer from SP Data memory to PE Data memories may be carried out by the following instruction sequences executed by Lane controller 1 and Lane controller 0:

Lane 1:

1. Clear STU - This makes the STU capable of receiving slave requests for IDQ FIFO access.
2. Transfer instruction - Transfer Core Inbound to PE Data address, "transfer count" words Lane 0:

1. Control instruction - setup event-action register to signal interrupt at EOT
2. Transfer instruction - Transfer Core Outbound from SP Data addresses, "transfer count" words
3. Transfer instruction - Transfer System Outbound to MDB slave address(es) of Lane 1, "transfer count" words. Lane 1 STU will write data to its IDQ.

Note that two lane controllers are used to carry out DMA-DMA transfers (or one lane controller an some other reading/writing MDB-master).

This same mechanism can be used by any device on the MDB to read/write to a Lane's data queues, allowing one DMA controller or I/O device to read/write data to another. The following two sections show how general "pull" and "push" model DMA-DMA transfers can be implemented.

6.1.1 "Pull model" DMA-DMA (or I/O)

To support a "pull" model DMA-to-DMA or I/O-to-DMA transfer:

1. Place STU of source DMA into the inactive state (by instruction or command).
2. Program source CTU with an instruction which gathers data from the desired memories and start the transfer. This causes the FIFO to be filled but the STU is inactive so that the FIFO will only respond to reads from the source Lane controller's MDB slave port.
3. Program the destination STU with a TSI.IO instruction using the source DMA's MDB slave address as the I/O transfer address to read from. Program the destination CTU with the desired transfer type for distributing data to destination memories and start the transfer.

The destination DMA Lane controller will "pull" data from the source DMA Lane controller until either source or destination transfer unit reaches an end-of-transfer (EOT) condition (items transferred is equal to transfer count requested). Semaphores may be used to make the setup and execution of the transfer almost entirely occur in the background.

6.1.2 "Push model" DMA-DMA (or I/O)

To support a "push" model DMA-to-DMA or I/O-to-DMA transfer:

1. Place STU of destination DMA into the inactive state (by instruction or command).
2. Program destination CTU with an instruction which distributes data to the desired memories and start the transfer. This causes the CTU to wait for data to arrive in the Inbound FIFO. The STU is inactive so that the FIFO will only respond to writes from the source Lane controller's STU.

3. Program the source STU with a TSO.IO instruction using the destination DMA's MDB slave address as the I/O transfer address to write to. Program the source CTU with the desired transfer type for gathering data from source memories and start the transfer.

The source DMA Lane controller will "push" data into the destination DMA Lane controller's Inbound FIFO until either source or destination transfer unit reaches an end-of-transfer (EOT) condition (items transferred is equal to transfer count requested). Semaphores may be used to make the setup and execution of the transfer almost entirely occur in the background.

6.2 Update Transfers

Update transfers are special instructions that allow an already loaded transfer to be updated with a new transfer count or new target address (or both) without affecting other parameters or state. These types of transfers are useful for minimizing DMA instruction space when processing transfers that are similar to each other.

6.3 Bit-Reverse PE Addressing

Bit-reverse PE addressing allows efficient scatter and gather of FFT data and coefficients. The DMA controller provides an efficient means for post-processing FFT calculations through its bit-reverse addressing capability.

Definitions

Bit reversal is a transposition of bits where the most significant bit (of a given "field" width) becomes least significant, and so on. For example, 0001011 will become 0011010 when the field width is 5 bits.

Digit reversal is a transposition of groups of bits (a group of bits defines a digit) where the most significant digit becomes least significant. For example, 0001011 will become 0111000 for field width 6 and digit width 2.

Discussion

In general an FFT and similar algorithms are faster when they produce out of order output. However, one can implement FFTs that preserve the ordering with some additional cost. The reordering depends upon the radix used.

| Radix | Reversal digit width |
|---|---|
| 2 | 1 |
| 4 | 2 |
| 8 | 3 |
| $2^k$ | k |

Algorithms with radix larger than 8 seem to be impractical, so we will only encounter digit widths 1-3. Also, any algorithm is capable in processing its own output, meaning that if algorithm A takes in-order input and produces some of the above reversals, then for the inverse transform, algorithm A with a reversed input of the same kind, will produce an in-order output.

The complications arise when one is faced with providing or dealing with a reversed ordering that is not the result of the algorithm at hand:

1) take reversed output from the PEs and generate in-order vector in external memory
2) take reversed output from the PEs and generate bit-reversed vector
3) the inverse of the above two.

Functionality

The offset or vector index can be considered as consisting of two fields:

a) the distributed address (usually this is the PE id) consisting of the most significant bits.
    b) the local address (rest of the bits).

To achieve 1), bit reverse PE ids and then digit reverse local address according to radix.

To achieve 2), only bit reverse within the digits.

The bit-reverse addressing supports radix 2, 4, and 8 FFTs (corresponding to digit widths of 1,2, and 3 bits respectively), reversed orderings (1) and (2) above with FFT sizes 256, 512, 1024, 2048, 4096 and 8192 (bits per PE address are 6, 7, 8, 9, 10, and 11 respectively).

NOTE: PE Address bits [1:0] are always assumed to be zero (they are not routed to PE since DMA transfers are only in 32-bit words for Manta).

| BitRev Code | PE Address Bits | | | | | | | | | | | | | |
|---|---|---|---|---|---|---|---|---|---|---|---|---|---|---|
| No reversal | 13 | 12 | 11 | 10 | 9 | 8 | 7 | 6 | 5 | 4 | 3 | 2 | 1 | 0 |
| | | | | | | | | | | | | | | |
| 0x01 | 13 | 12 | 11 | 10 | 9 | 8 | 2 | 3 | 4 | 5 | 6 | 7 | 1 | 0 |
| 0x02 | 13 | 12 | 11 | 10 | 9 | 2 | 3 | 4 | 5 | 6 | 7 | 8 | 1 | 0 |
| 0x03 | 13 | 12 | 11 | 10 | 2 | 3 | 4 | 5 | 6 | 7 | 8 | 9 | 1 | 0 |
| 0x04 | 13 | 12 | 11 | 2 | 3 | 4 | 5 | 6 | 7 | 8 | 9 | 10 | 1 | 0 |
| 0x05 | 13 | 12 | 2 | 3 | 4 | 5 | 6 | 7 | 8 | 9 | 10 | 11 | 1 | 0 |
| 0x06 | 13 | 2 | 3 | 4 | 5 | 6 | 7 | 8 | 9 | 10 | 11 | 12 | 1 | 0 |
| 0x07 | 13 | 12 | 11 | 10 | 9 | 8 | 3 | 2 | 5 | 4 | 7 | 6 | 1 | 0 |
| 0x08 | 13 | 12 | 11 | 10 | 3 | 2 | 5 | 4 | 7 | 6 | 9 | 8 | 1 | 0 |
| 0x09 | 13 | 12 | 3 | 2 | 5 | 4 | 7 | 6 | 9 | 8 | 11 | 10 | 1 | 0 |
| 0x0a | 13 | 12 | 11 | 10 | 9 | 8 | 6 | 7 | 4 | 5 | 2 | 3 | 1 | 0 |
| 0x0b | 13 | 12 | 11 | 10 | 8 | 9 | 6 | 7 | 4 | 5 | 2 | 3 | 1 | 0 |
| 0x0c | 13 | 12 | 10 | 11 | 8 | 9 | 6 | 7 | 4 | 5 | 2 | 3 | 1 | 0 |
| 0x0d | 13 | 12 | 11 | 10 | 9 | 8 | 4 | 3 | 2 | 7 | 6 | 5 | 1 | 0 |
| 0x0e | 13 | 12 | 11 | 4 | 3 | 2 | 7 | 6 | 5 | 10 | 9 | 8 | 1 | 0 |
| 0x0f | 13 | 12 | 11 | 10 | 9 | 8 | 5 | 6 | 7 | 2 | 3 | 4 | 1 | 0 |
| 0x10 | 13 | 12 | 11 | 8 | 9 | 10 | 5 | 6 | 7 | 2 | 3 | 4 | 1 | 0 |
| | | | | | | | | | | | | | | |
| Inputs per output address bit | 1 | 2 | 4 | 6 | 6 | 8 | 6 | 7 | 7 | 8 | 8 | 11 | | |

Assume a 5-bit "Bit Reversal" code which is always fed into a PE address output MUX. There are 17 possible variations, with a code value of 0 corresponding to "no reversal" of bits.

The Bit Reversal code will be stored in a DMA register, BITREV, whose default value is 0 (no reversal). This register is read/writable from the MCB. There is one BITREV register per Lane controller. This register is reset to 0 on DMA RESET.

BOPS, Inc.

DMA Register and Command Address Reference  BOPS, Inc. -   Manta SYSSIM 2.31

Table of Contents

1 DMA Register Map
2 Register Definitions 2.1 GR0, GR1, GR2, GR3 -- General Registers
2.2 LOCKID -- Lock ID Register
2.3 SEM - Semaphore Register
2.4 PETABLE - PE Translate Table Register 2.5 EXTSIG - External Signal Register
2.6 TSR0 -- Transfer Status Register 0 (Read-Only)
2.7 TSR1 -- Transfer Status Register 1 (Read-only)
2.8 TSR2 -- Transfer Status Register 2 (Read-only)
2.9 TSR3 -- Transfer Status Register 3 (Read-only)
2.10 TPC - Transfer Program Counter
2.11 WAITPC - Wait Program Counter
2.12 LINKPC - Link Program Counter
2.13 EAR0 - Event / Action Register 0
2.14 EAR1 - Event/Action Register 1
2.15 BITREV - Bit-Reversal Addressing Register
2.16 ITCNT - Initial Transfer Count Register
2.17 TCNT - Transfer Count Register

1 DMA Register Map

| Name | System Address (not SP relative) | | Description |
|---|---|---|---|
| | Lane 0 | Lane 1 | |
| Base Address | 0x00708000 | 0x00708400 | |
| | Register Offset | | |
| RESUME | 0x03 | | Write-only address |
| CLEARSTU | 0x05 | | Write-only address |
| RESTART | 0x07 | | Write-only address |
| RESTARTCTU | 0x09 | | Write-only address |
| RESET | 0x20 | | Write-only address |
| INITSTC | 0x30 | | Write-only address + data (updates both STC and ISTC) |
| INITCTC | 0x34 | | Write-only address + data (updates both CTC and ICTC) |
| WRITESTC | 0x38 | | Write-only address + data (updates only STC, not ISTC) |
| WRITECTC | 0x3c | | Write-only address + data (updates only CTC not ICTC) |
| LOCK0 | 0x50 | | Read-address. Read returns 1 if locked, 0 if not locked (lock granted) |
| LOCK2 | 0x52 | | Read-address. Read returns 1 if locked, 0 if not locked (lock granted) |
| LOCK4 | 0x54 | | Read-address. Read returns 1 if locked, 0 if not locked (lock granted) |
| LOCK6 | 0x56 | | Read-address. Read returns 1 if locked, 0 if not locked (lock granted) |
| EAR0 | 0x114 | | Read/Write address |
| BITREV | 0x11c | | Read/WRite |
| GR0 | 0x120 | | Read/Write address |
| GR1 | 0x124 | | Read/Write address |
| GR2 | 0x128 | | Read/Write address |
| GR3 | 0x12c | | Read/Write address |
| PETABLE | 0x130 | | Read/Write address |
| ITCNT | 0x134 | | Read/Write address |
| TCNT | 0x138 | | Read/Write address |
| LOCKID | 0x13c | | Read/Write address |
| TSR0 | 0x140 | | Read-only address |
| TSR1 | 0x144 | | Read-only address |
| TSR2 | 0x148 | | Read-only address |
| TSR3 | 0x14c | | Read-only address |

DMA Instruction Set Reference - Transfer Instructions

BOPS, Inc. - Manta SYSSIM 2.31

Table of Contents

1 Transfer Instructions

1.1 PE Addressing
1.2 General Notes
1.3 General Format for Transfer Instructions
1.4 Transfer Core Inbound / Transfer Core Outbound (TCI / TCO)
1.5 Transfer System Inbound / Transfer System Outbound (TSI / TSO)

1 Transfer Instructions

Transfer instructions specify:

- which transfer unit they target,
- direction (inbound or outbound),
- data type,
- addressing mode,
- execution control, and
- optional parameters.

Both the STU and CTU support a number of addressing modes in common, including:

- Single-address (I/O),
- Block,
- Stride,
- Circular,
- etc.

The CTU supports an additional set of addressing modes that are specialized for multiple memory access. These are provided to collect/distribute data from/to an array of processing elements (PEs).

DMA transfer instructions are executed by either of two transfer units, the STU or CTU. When processing a transfer between two memories in the system, these units operate in parallel and each operates on its own instruction. Two transfer instructions are required to carry out most types of memory-to-memory transfers.

In some types of transfers, one unit can be active while the other unit is fed multiple transfer instructions. This is particularly useful for multiplexing data from multiple sources into a single destination, or demultiplexing data from a single source to multiple destinations.

A single transfer instruction may be used in the CTU when the STU is inactive to allow the FIFOs to be accessed for read or write from an MDB data port address. This form of transfer is used to allow DMA-DMA transfers and other external devices to read or write directly from/to the IDQ/ODQ FIFOs.

1.1 PE Addressing

Any individual PE memory may be accessed using the I/O, Block, Stride or Circular address modes. Because of the manner in which PEs operate on data, it is important to be able to distribute and collect data to/from multiple PEs within the same transfer.

The primary requirement for accessing PE local memories for data transfers is that there be significant flexibility, both in the order of PE access and in the order of data access within each PE. The philosophy behind PE Address control is that data is to be distributed to, or collected from, the PE local memories in a periodic fashion, where the access pattern within a single (multiple-access) period may be complex. The purpose of this approach is to minimize the number of DMA transfers required to generate a specified data access ordering.

All PE addressing involves generating a new *transfer address* (TA) for each access. The TA consists of 2 components:

- PE ID
- Offset into PE memory

The memory offset is determined using a base address value and an index value.

The initial PE ID is the first ID in the PE Translate table (see PEXLAT instruction, and PETABLE register).

If PE local memories are collectively viewed as a two dimensional array in which the first index refers to the PE and the second to the address within the PE, then in the general case the TA may be given as:

```
TA = PEMemory[PE][Base + Index]
```

The sequence of memory addresses generated for particular transfers is determined by the order and manner in which the PE, Base and Index values are updated after each access.

1.2 General Notes

- Address generation parameters that specify counts range in value from 1 to $2^N$ where N is the number of bits in the parameter (all bits zero represents $2^N$ for an N-bit number). The transfer counts (ISTC, STC, ICTC, and CTC) have this same property. They cannot be written with a zero value. When either the STC or CTC becomes zero (after having been written by a host processor), the STUeot or CTUeot flag is set, indicating the state. These flags qualify the values in the STC or CTC registers.

- Addresses are always assumed to be byte addresses even though the smallest data type currently supported is 32-bits. Therefore, the least significant two bits of all memory addresses used as the source or destination of transfers (not MCB addresses) must be zero.

- If an invalid instruction is decoded, the lane controller enters the ERROR state and sets a flag in the Transfer Status Register 0 (TSR0) that indicates an error has occurred. A RESET command or hard reset must be asserted to the lane controller (or the entire DMA controller) to recover from the error condition.

1.3 General Format for Transfer Instructions

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 11 | | Xfer Type | | | C/S | I/O | Data Type | | | Addr Mode | | | X | Rsrvd | | | | | Transfer Count | | | | | | | | | | | | |
| Other Parameters depending on transfer type (Xfer Type) and address generation control (Addr Mode) - possibly multiple words | | | | | | | | | | | | | | | | | | | | | | | | | | | | | | | |

Description

| | |
|---|---|
| Xfer Type | 00 = New Transfer |
| | 01 = Update Transfer Count |
| | 10 = Update Transfer Address (reload current transfer count) |
| | 11 = Update Transfer Count and Transfer Address |
| | |
| C/S | 0 = CTU instruction, 1 = STU instruction |
| | |
| I/O | 0 = Inbound, 1 = Outbound |
| | |
| Data Type | 00 = 32-bit word |
| | 01 = reserved |
| | 10 = reserved |
| | 11 = reserved |
| | |
| Addr Mode | 0000 = Single address (I/O) |
| | 0001 = Block transfer |
| | 0010 = Stride/Hold |
| | 0011 = reserved |
| | 0100 = reserved |
| | 0101 = Circular |
| | 0110 = reserved |
| | 0111 = reserved |
| | 1000 = PE Block Cyclic (CTU only) |
| | 1001 = PE with Index Select (CTU only) |
| | 1010 = PE with PE Select (CTU only) |
| | 1011 = PE with PE Select and Index Select (CTU only) |
| | 1100 = reserved |
| | 1101 = reserved |
| | 1110 = reserved |
| | 1111 = reserved |
| | |
| X | 0 = load instruction and continue in FETCH_DEC state, |
| | 1 = load instruction and goto EXEC_XFER state. |
| | |
| Rsrv | Reserved field |

1.4 Transfer Core Inbound / Transfer Core Outbound (TCI / TCO)

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 1 | 1 | XferType | | 0 | I/O | | 0 | 0 | Addr Mode | | | | X | Rsrvd | | | | | Core Transfer Count (CTC) | | | | | | | | | | | | |
| Parameters | | | | | | | | | | | | | | | | | | | | | | | | | | | | | | | |

Description
Supported transfer types (Xfer Type) are:

| | |
|---|---|
| Xfer Type | 00 = New Transfer |
| | 01 = Update Transfer |
| | 10 = Reserved |
| | 11 = Reserved |

For the Update transfer types, the Address Mode field is ignored.

Supported Address Modes are:

```
Addr Mode   0000 = Single Address (I/O)
            0001 = Block transfer
            0010 = Stride
            0011 = reserved
            0100 = reserved
            0101 = Circular
            0110 = reserved
            0111 = reserved
            1000 = PE Block Cyclic (CTU only)
            1001 = PE with Index Select (CTU only)
            1010 = PE with PE Select (CTU only)
            1011 = PE with PE Select and Index Select (CTU only)
            1100 = reserved
            1101 = reserved
            1110 = reserved
            1111 = reserved
```

Notes:
The data source for TCI is the Inbound Data Queue (IDQ), and the destination for TCO is the Outbound Data Queue (ODQ).

1.5 Transfer System Inbound / Transfer System Outbound (TSI / TSO)

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 1 | 1 | XferType | | 1 | I/O | 0 | 0 | Addr Mode | | | | X | 0 | Rsrv | | System Transfer Count (STC) | | | | | | | | | | | | | | | |
| Parameters | | | | | | | | | | | | | | | | | | | | | | | | | | | | | | | |

Description
Supported transfer types (Xfer Type) are:

```
Xfer Type   00 = New Transfer
            01 = Update Transfer Count
            10 = Update Transfer Address (reload current transfer count)
            11 = Update Transfer Count and Transfer Address
```

For the Update transfer types, the Address Mode field is ignored.

Supported Address Modes are:

```
Addr Mode   0000 = Single Address (I/O)
            0001 = Block transfer
            0010 = Stride
            0011 = reserved
            0100 = reserved
            0101 = Circular
            0110 = reserved
            0111 = reserved
            1000 = reserved
            1001 = reserved
            1010 = reserved
            1011 = reserved
            1100 = reserved
```

1101 = reserved
1110 = reserved
1111 = reserved

Notes:
The data source for TSO is the Outbound Data Queue (ODQ), and the destination for TSI is the Inbound Data Queue (IDQ).

---

BOPS, Inc.

TCx.IO

BOPS, Inc. -   Manta  SYSSIM 2.31

| 31 30 | 29 28 27 | 26 | 25 24 | 23 22 21 20 | 19 18 | 17 | 16 | 15 14 13 12 11 10 09 08 07 06 05 04 03 02 01 00 |
|---|---|---|---|---|---|---|---|---|
| 11 | 00 | 0 | I/O | 00 | Addr Mode = 0000 | X | 0 | 00 | Core Transfer Count (CTC) |
| Transfer Address |||||||||

CTC             Core Transfer Count. Number of data items to transfer.

Transfer Address     Address from (or to) which to transfer data.

Description

This instruction performs reads from (TCO), or writes to (TCI) a single address specified by Transfer Address. The number of words transferred is CTC.

Note: This instruction may be used primarily for test purposes.

---

BOPS, Inc.

TCx.Block

BOPS, Inc. - Confidential   Manta  SYSSIM 2.31

| 31 30 | 29 28 27 | 26 | 25 24 | 23 22 21 20 | 19 18 | 17 | 16 | 15 14 13 12 11 10 09 08 07 06 05 04 03 02 01 00 |
|---|---|---|---|---|---|---|---|---|
| 11 | 00 | 0 | I/O | 00 | Addr Mode = 0001 | X | 0 | 00 | Core Transfer Count (CTC) |
| Transfer Address |||||||||

CTC             Core Transfer Count. Number of data items to transfer.

Transfer Address     Start address of the transfer

Description

This instruction performs either a read from (TCO), or a write to (TCI) a sequence of contiguous, monotonically increasing addresses (using the data type specified in bits 25:24), starting with "Transfer Address" for "CTC" addresses.

TCx.Stride

| 31 30 | 29 28 | 27 | 26 | 25 24 | 23 22 21 20 | 19 18 | 17 | 16 | 15 14 13 12 11 10 09 08 07 06 05 04 03 02 01 00 |
|---|---|---|---|---|---|---|---|---|---|
| 11 | 00 | 0 | I/O | 00 | Addr Mode = 0010 | X | 0 | 00 | Core Transfer Count (CTC) |
| Transfer Address ||||||||||
| Index Count (Hold) Range: 1 to 65536 ||||| Base Update (Stride) Range: 1 to 65536 |||||

CTC             Core Transfer Count. Number of data items to transfer.

Transfer Address    Start address of the transfer

Index Count (Hold)  Number of contiguous data items in a block

Base Update (Stride)    Distance between successive blocks. Units are of "data type" size.

Description

In stride address mode data is accessed in contiguous blocks of "Index Count" words where each block start address is separated from the next by "Base Update" (Stride) words. An example pattern for base update value of 8 and an index count ("hold") value of 4 is shown below. The number of words transferred is specified by the CTC parameter.

*Figure 1.Example of access pattern for Stride address control with Stride = 8, Hold = 4*

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| Start "hold" block at TA+0 |||| Start "hold" block at TA+8 |||| Start "hold" block at TA+16 |||| Start "hold" block at TA+24 ||||||||||||||||||||

BOPS, Inc. – Confidential

TCx.Circular

BOPS, Inc. – Confidential    Manta SYSSIM 2.31

| 31 30 | 29 28 | 27 | 26 | 25 24 | 23 22 21 20 | 19 18 | 17 | 16 | 15 14 13 12 11 10 09 08 07 06 05 04 03 02 01 00 |
|---|---|---|---|---|---|---|---|---|---|
| 11 | 00 | 0 | I/O | 00 | Addr Mode = 0101 | X | 0 | 00 | Core Transfer Count (CTC) |
| Circular Buffer Base Address (CBBA) ||||||||||
| Circular Buffer Size (BufSize) Range: 1 to 65536 ||||| Init (Index) Range: 0 to 65535 |||||

CTC                         Core Transfer Count. Number of data items to transfer.

Circular Buffer Base Address    Start address of circular buffer.

BufSize                     Number of elements in the circular buffer.

Init Index                  Initial offset into the circular buffer. Offset is in "datatype" size units.

Description

The Circular addressing mode specifies a circular buffer whose base address is "Circular Buffer Base Address" (CBBA) and whose size is BufSize. The initial offset into the buffer may be specified by "Init Index". "CTC" successive elements are transferred such that the address is always maintained between CBBA and CBBA+BufSize-1, inclusive.

Given that Index is the current offset into the circular buffer (relative to CBBA) the operation is defined as:

```
Access Address = CBBA + Index
If ( (Index + 1 - BufSize) == 0 )
    Index = 0;
else
    Index = Index + 1;
```

If the Initial Index is specified as larger than BufSize, then the access pattern in unspecified.

---

BOPS, Inc. - Confidential

TCx.PEBlockCyclic

BOPS, Inc. - Confidential   Manta   SYSSIM 2.31

| 31 30 | 29 28 | 27 | 26 | 25 24 | 23 22 21 20 | 19 18 | 17 | 16 | 15 14 13 12 11 10 09 08 07 06 05 04 03 02 01 00 |
|---|---|---|---|---|---|---|---|---|---|
| 11 | 00 | 0 | I/O | 00 | Addr Mode = 1000 | X | 0 | 00 | Core Transfer Count (CTC) |
| Reserved ||||||||| Starting Transfer Address (within PE memory) |
| Loop Ctrl || PE Count ||| Base Update Count Range: 1 to 256 |||| Base Update (Stride) Range: |
| Index Count (Hold) Range: |||||| Reserved ||| Index Update Range: 1-256 |

Loop Ctrl
: Loop Ctrl specifies a particular order in which PE, Base and Index values are updated. Three possible orders are selectable which correspond to three assignments of PE, Base and Index update to three nested control loops (outer, middle and inner).
  00 = Base (outer), Index (middle), PE (inner) - BIP
  01 = Base (outer), PE (middle), Index (inner) - BPI
  10 = PE (outer), Base (middle), Index (inner) - PBI PE Count
: Specifies the number of PEs to be accessed for each time the PE counter is signaled to reload. Valid values are:
  0000 = Max Number of PEs as specified in the PE Configuration Register
  0001 = 1
  0010 = 2
  0011 = 3 etc., etc.

Base Update (Stride)
: Distance between successive blocks. Units are of "data type" size.

Base Update Count
: Used for PBI Loop Control. Specifies the number of time the Base is updated before exiting to the outer loop (PE update). Range is 1 to 256.

Index Count (Hold)
: Number of contiguous data items in a block

Index Update
: Distance between successive items within a block. Units are of "data type" size.

Description

Address generation for the PE addressing modes may be modeled with three nested "For" loops, where each loop updates either a PE memory start address, a Base (relative to the PE address), or an Index (relative to Base). The access address is given by: Access Address = Memory[PE, Base + Index]. The assignment of these three parameter to the three loops (outer, middle and inner) results in varying orders of data distribution to the same set of PE memory addresses. This reordering allows the placement (or removal) of data to (from) different positions on the array.

LOOP Control Examples

Given:

- An inbound sequence of 16 data with values 0,1,2,3,...15
- PETABLE setting of 0x000000E4 (no translation of PE IDs)
- TSI.block instruction in the STU (reading the 16 values from system memory)
- TCI.blockcyclic instruction in the CTU with PE count = 4, Base Update = 8, Base Count=2 (used for PBI mode only), Index Update = 2, Index Count = 2.

The resulting data in the PE memories for each type of LOOP control would be:

Loop Control: BIP (PE ID varies first, then Index, then Base)

| Address | PE0 | PE1 | PE2 | PE3 |
|---------|-----|-----|-----|-----|
| 0x0000  | 0   | 1   | 2   | 3   |
| 0x0001  |     |     |     |     |
| 0x0002  | 4   | 5   | 6   | 7   |
| 0x0003  |     |     |     |     |
| 0x0004  |     |     |     |     |
| 0x0005  |     |     |     |     |
| 0x0006  |     |     |     |     |
| 0x0007  |     |     |     |     |
| 0x0008  | 8   | 9   | 10  | 11  |
| 0x0009  |     |     |     |     |
| 0x000a  | 12  | 13  | 14  | 15  |

Loop Control: BPI (Index varies first, then PE ID, then Base)

| Address | PE0 | PE1 | PE2 | PE3 |
|---------|-----|-----|-----|-----|
| 0x0000  | 0   | 2   | 4   | 6   |
| 0x0001  |     |     |     |     |
| 0x0002  | 1   | 3   | 5   | 7   |
| 0x0003  |     |     |     |     |
| 0x0004  |     |     |     |     |
| 0x0005  |     |     |     |     |
| 0x0006  |     |     |     |     |
| 0x0007  |     |     |     |     |
| 0x0008  | 8   | 10  | 12  | 14  |
| 0x0009  |     |     |     |     |
| 0x000a  | 9   | 11  | 13  | 15  |

Loop Control: PBI (Index varies first, then Base, then PE ID)

| Address | PE0 | PE1 | PE2 | PE3 |
|---------|-----|-----|-----|-----|
| 0x0000  | 0   | 4   | 8   | 12  |
| 0x0001  |     |     |     |     |
| 0x0002  | 1   | 5   | 9   | 13  |
| 0x0003  |     |     |     |     |
| 0x0004  |     |     |     |     |
| 0x0005  |     |     |     |     |
| 0x0006  |     |     |     |     |
| 0x0007  |     |     |     |     |
| 0x0008  | 2   | 6   | 10  | 14  |
| 0x0009  |     |     |     |     |
| 0x000a  | 3   | 7   | 11  | 15  |

Note that a for PBI mode, the base count must be 2 in order to get 2 "blocks" of data. Index count corresponds to the number of elements written before updating the next address variable. The gap between elements within a PE is due to the Index Update value of 2 (rather than 1).

BOPS, Inc. - Confidential

TCx.PESelectIndex

BOPS, Inc. - Confidential   Manta   SYSSIM 2.31

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|----|----|----|----|----|----|----|----|----|----|----|----|----|----|----|----|----|----|----|----|----|----|----|----|----|----|----|----|----|----|----|----|
| 11 |    | 00 |    | 0  | I/O |   | 00 | Addr Mode = 1001 |  |  |  | X | 0 | 00 |   | Core Transfer Count (CTC) ||||||||||||||||
| IU Count |||| Reserved |||||||||||| Starting Transfer Address (within PE memory) ||||||||||||||||
| Loop Ctrl |||| PE Count |||| Base Update Count |||||||| Base Update (Stride) ||||||||||||||||
| IU7 |||| IU6 |||| IU5 |||| IU4 |||| IU3 |||| IU2 |||| IU1 |||| IU0 ||||

Loop Ctrl    Loop Ctrl specifies a particular order in which PE, Base and Index values are updated. Three possible orders are selectable which correspond to three assignments of PE, Base and Index update to three nested control loops (outer, middle and inner).
00 = Base (outer), Index (middle), PE (inner) - BIP
01 = Base (outer, PE (middle), Index (inner) - BPI
10 = PE (outer), Base (middle), Index (inner) -- PBI PE Count    Specifies the number of PEs to be accessed for each time the PE counter is signaled to reload. Valid values are:
0000 = Max Number of PEs as specified in the PE Configuration Register
0001 = 1
0010 = 2
0011 = 3 etc., etc.

Base Update (Stride)    Distance between successive blocks. Units are of "data type" size.

Base Update Count    Used for PBI Loop Control. Specifies the number of time the Base is updated before exiting to the outer loop (PE update). Range is 1 to 256.

| | |
|---|---|
| IUx | IU0 - IU7 form an index update table with each entry being a 4-bit update value. Update values are integers in the range of -8 to +7. |
| IU Count | Index Update Count. This is the number of entries in the index update table. When 'IU Count' index updates have occurred (with associated accesses before update), the next outer loop variable (B or P) is updated. [Note that the number of accesses within the Index loop is 1 greater than the Index Update Count, e.g. an IU Count of 6 implies 7 accesses will occur before the index loop exits.] Subsequent index updates start at the first entry again (IU0). If 'IU Count' is greater than 8, the table entries are used again, starting at the beginning of the table. |

Description

Address generation for the PE addressing modes may be modeled with three nested "For" loops, where each loop updates either a PE memory start address, a Base (relative to the PE address), or an Index (relative to Base). The access address is given by:
Access Address = Memory[PE, Base + Index]. The assignment of these three parameter to the three loops (outer, middle and inner) results in varying orders of data distribution to the same set of PE memory addresses. This reordering allows the placement (or removal) of data to (from) different positions on the array.

The Index Select parameter allows finer-grained control over a sequence of Index values to be accessed. This is done using a table of 8 4-bit index-update (IU) values. Each time the index loop is updated, an IU value is added to the effective address. These update values are accessed from the table sequentially starting from IU0 for IUCount updates. After IUCount updates (and IUCount + 1 accesses), the index update loop is complete and the next outer loop (B or P) is activated. On the next activation of the index loop IU values are accessed starting at the beginning of the table.

Example of Select Index Addressing

The transfer instruction consisting of the following 4 words generates the access pattern below (assuming the PE Translate Table has the value 0xE4, a direct mapping order PE0, PE1, PE2, PE3) :

| | |
|---|---|
| 0xC0900064 | ;Transfer Core-Inbound, Address mode =PESelectIndex, Count=100 |
| 0x60000000 | ;IUCount = 6, PE Start Address = 0x0000 |
| 0x00000040 | ;Loop Control = BIP, PE Count = 4, Base Update Count = 0, Base Update = 0x0040 |
| 0x00EEF222 | ;Index Updates are, in order: +2, +2, +2, -1, -2, -2 |

Addresses Accessed (these are byte addresses while DMA address updates are in 32-bit words):

| | |
|---|---|
| PE0, 0x0000 | ;Note: With BIP loop control PE address changes in inner loop, then index, then base |
| PE1, 0x0000 | |
| PE2, 0x0000 | |
| PE3, 0x0000 | ;PE terminal count reached here, so index update is used |
| PE0, 0x0008 | ;New index (+2), restart PE loop (PE count is 4, but it could be 1, 2, or 3). |
| PE1, 0x0008 | ;In addition the PE Translate table could result in an out of order access to PEs. |
| PE2, 0x0008 | |
| PE3, 0x0008 | |
| PE0, 0x0010 | ;New Index (+2) |
| PE1, 0x0010 | |
| PE2, 0x0010 | |
| PE3, 0x0010 | |
| PE0, 0x0018 | ;New index (+2) |

PE1, 0x0018
PE2, 0x0018
PE3, 0x0018
PE0, 0x0014 ;New index (-1)
PE1, 0x0014
PE2, 0x0014
PE0, 0x000c ;New index (-2)
PE1, 0x000c
PE2, 0x000c
PE3, 0x000c
PE0, 0x0004 ;New index (-2)
PE1, 0x0004
PE2, 0x0004
PE3, 0x0004
PE0, 0x0100 ;New Base occurs here and the pattern repeats, based at 0x0100
PE1, 0x0100
PE2, 0x0100
PE3, 0x0100
PE0, 0x0108
PE1, 0x0108
PE2, 0x0108
PE3, 0x0108
etc.
etc.

Use of a different loop control value alters the PE, Base and Index update order, resulting in different memory access patterns.

BOPS, Inc. - Confidential

TCx.PESelectPE

BOPS, Inc. - Confidential  Manta SYSSIM 2.31

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 11 | | 00 | | 0 | I/O | | 00 | Addr Mode = 1010 | | | | X | | 0 | 00 | Core Transfer Count (CTC) | | | | | | | | | | | | | | | |
| Loop Ctrl | | | | PE Count | | | | Base Update Count | | | | Base Update (Stride) | | | | | | | | | | | | | | | | | | | |
| Index Count (Hold) Range: 1 to 65536 | | | | | | | | | | | | Reserved | | | | | | | | | Index Update Range: 1-256 | | | | | | | | | |
| PEMSK7 | | | | PEMSK6 | | | | PEMSK5 | | | | PEMSK4 | | | | PEMSK3 | | | | PEMSK2 | | | | PEMSK1 | | | | PEMSK0 | | | |

Loop Ctrl  Loop Ctrl specifies a particular order in which PE, Base and Index values are updated. Three possible orders are selectable which correspond to three assignments of PE, Base and Index update to three nested control loops (outer, middle and inner).
00 = Base (outer), Index (middle), PE (inner) - BIP
01 = Base (outer), PE (middle), Index (inner) - BPI
10 = PE (outer), Base (middle), Index (inner) -- PBI PE Count  (Not used for this address mode)

| | |
|---|---|
| Base Update (Stride) | Distance between successive blocks. Units are of "data type" size. |
| Base Update Count | Used for PBI Loop Control. Specifies the number of time the Base is updated before exiting to the outer loop (PE update). Range is 1 to 256. |
| Index Count (Hold) | Number of contiguous data items in a block |
| Index Update | Distance between successive items within a block. Units are of "data type" size. |
| PEMSKx | These values form a table of 4-bit fields that are used to specify PE selections for up to 8 passes through the PEs. For each four bit field, a `1' bit selects the PE corresponding to its bit position. PEMSK0 must have at least one `1' bit, and the first all-zero field detected causes selection to begin again with the PEMSK0 field. |

Description

Address generation for the PE addressing modes may be modeled with three nested "For" loops, where each loop updates either a PE memory start address, a Base (relative to the PE address), or an Index (relative to Base). The access address is given by: Access Address = Memory[PE, Base + Index]. The assignment of these three parameter to the three loops (outer, middle and inner) results in varying orders of data distribution to the same set of PE memory addresses. This reordering allows the placement (or removal) of data to (from) different positions on the array.

The PE select fields together with the use of the PE Translate table allow out of order access to PEs across multiple passes through them.

Example of Select-PE addressing

- Assume BIP loop control
- Assume a PE translate table that maps 0-1, 1-2, 2-3, 3- 0. (table value is 0x39)
- (PE changes in the inner loop) and the following DMA instruction:

| | |
|---|---|
| 0xC0A00064 | ;Transfer Core-Inbound, Address mode =PESelectIndex, Count=100 |
| 0x00000000 | ;PE Start Address = 0x0000 |
| 0x00000040 | ;Loop Control = BIP, PE Count = N/A, Base Update Count = 0, Base Update = 0x0040 |
| 0x00040001 | ;Index Count = 4, Index Update = 1 |
| 0x00000F77 | ;PE access patterns |

Addresses Accessed (addresses shown are byte addresses-DMA uses word addresses internally).

| PE "virtual" Id (VID) | PE Physical ID (PID) | PE Address Offset | Comment |
|---|---|---|---|
| 0 | 1 | 0x0000 | Starting address |
| 1 | 2 | 0x0000 | |
| 2 | 3 | 0x0000 | |
| 0 | 1 | 0x0004 | update index |
| 1 | 2 | 0x0004 | |
| 2 | 3 | 0x0004 | |

| | | | |
|---|---|---|---|
| 0 | 1 | 0x0008 | update index |
| 1 | 2 | 0x0008 | |
| 2 | 3 | 0x0008 | |
| 3 | 0 | 0x0008 | |
| 0 | 1 | 0x000c | update index, restart w/ PEMSK0 |
| 1 | 2 | 0x000c | |
| 2 | 3 | 0x000c | |
| 0 | 1 | 0x0040 | update base, update index, PEMSK0 |
| 1 | 2 | 0x0040 | |
| 2 | 3 | 0x0040 | |
| 0 | 1 | 0x0044 | update index |
| 1 | 2 | 0x0044 | |
| 2 | 3 | 0x0044 | |
| 0 | 1 | 0x0048 | update index |
| 1 | 2 | 0x0048 | |
| 2 | 3 | 0x0048 | |
| 3 | 0 | 0x0048 | |
| 0 | 1 | 0x004c | update index |
| 1 | 2 | 0x004c | |
| 2 | 3 | 0x004c | |
| etc. | etc. | etc. | |

BOPS, Inc. - Confidential

TCx.PESelectIndexPE

BOPS, Inc. - Confidential  Manta  SYSSIM 2.31

| 31 30 29 28 | 27 26 | 25 | 24 | 23 22 21 20 | 19 18 | 17 | 16 | 15 14 13 12 11 10 09 08 07 06 05 04 03 02 01 00 |
|---|---|---|---|---|---|---|---|---|
| 11 | 00 | 0 | I/O | 00 | Addr Mode = 1011 | X | 0 | 00 | Core Transfer Count (CTC) |
| IU Count | Reserved | Starting Transfer Address (within PE memory) |
| Loop Ctrl | PE Count | Base Update Count | Base Update (Stride) |
| IU7 | IU6 | IU5 | IU4 | IU3 | IU2 | IU1 | IU0 |
| PEMSK7 | PEMSK6 | PEMSK5 | PEMSK4 | PEMSK3 | PEMSK2 | PEMSK1 | PEMSK0 |

Loop Ctrl   Loop Ctrl specifies a particular order in which PE, Base and Index values are updated. Three possible orders are selectable which correspond to three assignments of PE, Base and Index update to three nested control loops (outer, middle and inner).
00 = Base (outer), Index (middle), PE (Inner) - BIP
01 = Base (outer), PE (middle), Index (inner) - BPI
10 = PE (outer), Base (middle), Index (inner) — PBI PE Count   (Not used for this address mode)

Base Update (Stride)   Distance between successive blocks. Units are of "data type" size.

| | |
|---|---|
| Base Update Count | Used for PBI Loop Control. Specifies the number of time the Base is updated before exiting to the outer loop (PE update). Range is 1 to 256. |
| IU Count | Index Update Count. This is the number of entries in the index update table. When 'IU Count' index updates have occurred (with associated accesses after update), the next outer loop variable (B or P) is updated. Subsequent index updates start at the first entry again (IU0). If 'IU Count' is greater than 8, the table entries are used again, starting at the beginning of the table. |
| IUx | IU0 - IU7 form an index update table with each entry being a 4-bit update value. Update values are integers in the range of -8 to +7. |
| PEMSKx | These values form a table of 4-bit fields that are used to specify PE selections for up to 8 passes through the PEs. For each four bit field, a '1' bit selects the PE corresponding to its bit position. PEMSK0 must have at least one '1' bit, and the first all-zero field detected causes selection to begin again with the PEMSK0 field. |

Description

Address generation for the PE addressing modes may be modeled with three nested "For" loops, where each loop updates either a PE memory start address, a Base (relative to the PE address), or an Index (relative to Base). The access address is given by: Access Address = Memory[PE, Base + Index]. The assignment of these three parameter to the three loops (outer, middle and inner) results in varying orders of data distribution to the same set of PE memory addresses. This reordering allows the placement (or removal) of data to (from) different positions on the array.

The PESelectIndexPE addressing mode combines Index selection and PE selection into one addressing mode. This form of addressing provides for complex-periodic data access patterns.

Example of Select-Index-PE Addressing

- Assume BIP loop control
- Assume a PE translate table that maps 0-1, 1-2, 2-3, 3- 0. (table value is 0x39).
- The following DMA instruction:

0xC0B00064 ;Transfer Core-Inbound, Address mode = PESelectIndex, Count=100
0x20000000 ;Index Update Count = 2, PE Start Address = 0x0000
0x00000006 ;Loop Control = BIP, PE Count = N/A, Base Update Count = 0, Base Update = 0x0006
0x00000032 ;Index Select table: +2, then +3
0x00000F77 ;PE access patterns Addresses Accessed (addresses shown are byte addresses-DMA uses word addresses internally).

| PE "virtual" Id (VID) | PE Physical ID (PID) | PE Address Offset | Comment |
|---|---|---|---|
| 0 | 1 | 0x0000 | Starting address |
| 1 | 2 | 0x0000 | |
| 2 | 3 | 0x0000 | |
| 0 | 1 | 0x0008 | update index |
| 1 | 2 | 0x0008 | |
| 2 | 3 | 0x0008 | |
| 0 | 1 | 0x0014 | update index |
| 1 | 2 | 0x0014 | |

| | | | |
|---|---|---|---|
| 2 | 3 | 0x0014 | |
| 3 | 0 | 0x0014 | |
| 0 | 1 | 0x0018 | update index, update base |
| 1 | 2 | 0x0018 | |
| 2 | 3 | 0x0018 | |
| 0 | 1 | 0x0020 | update index |
| 1 | 2 | 0x0020 | |
| 2 | 3 | 0x0020 | |
| 0 | 1 | 0x002C | update index |
| 1 | 2 | 0x002C | |
| 2 | 3 | 0x002C | |
| 3 | 0 | 0x002C | |
| 0 | 1 | 0x0030 | update index, update base |
| 1 | 2 | 0x0030 | |
| 2 | 3 | 0x0030 | |
| 0 | 1 | 0x0038 | update index |
| 1 | 2 | 0x0038 | |
| 2 | 3 | 0x0038 | |
| etc. | etc. | etc. | |

BOPS, Inc. - Confidential

TCx.Update

BOPS, Inc. - Manta SYSSIM 2.31

| 31 30 | 29 28 | 27 | 26 | 25 24 23 22 | 21 20 | 19 | 18 | 17 16 | 15 14 13 12 11 10 09 08 07 06 05 04 03 02 01 00 |
|---|---|---|---|---|---|---|---|---|---|
| 11 | 01 | 0 | I/O Update | 0 (reserved) | Update Type | X | 0 | 00 | Core Transfer Count (CTC) (if update CTC specified in Update Type) |
| Core Transfer Address (CTA) (if address update specified in Update Type) ||||||||||

CTC     Core Transfer Count. This field is used when Update Type specifies a CTC update.

CTA     Core Transfer Address. This word of the instruction is included when CTA update is specified.

L     Lock in the transfer once started.

X     Begin transfer after loading this instruction

Update Type     Specifies what parts (if any of the instruction currently in the CTU are to be updated)

00 = If CTC is zero, reload with ICTC (Initial CTC) value. If CTC is non-zero do not update. (This allows a transfer to be continued with no changes)
    01 = Update (new) CTC.
    10 = Update (new) CTA. If CTC is zero, reload from initial value, otherwise it is left at its current value.
    11 = Update (new) CTC and CTA I/O     0 = Inbound
    1 = Outbound

Description

This instruction optionally updates the CTU with a new transfer count and transfer address.

If 'Update Type' is 00, then the CTC is reloaded from ICTC if it is zero, or left unchanged if it is non-zero. If the CTU is currently in the IDLE state, then it is enabled to run with its current parameters if 'X' is 0 or placed in the transfer state if 'X' is 1.

---

BOPS, Inc.

TSx.IO

BOPS, Inc. - Manta SYSSIM 2.31

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|----|----|----|----|----|----|----|----|----|----|----|----|----|----|----|----|----|----|----|----|----|----|----|----|----|----|----|----|----|----|----|----|
| 11 | | 00 | | | 1 | I/O | | 00 | | | | Addr Mode = 0000 | | | | X | | 0 | | 00 | | | | System Transfer Count (STC) | | | | | | | |
| Transfer Address |||||||||||||||||||||||||||||||||

STC              System Transfer Count. Number of data items to transfer.

Transfer Address     Address from (or to) which to transfer data.

Description

This instruction performs reads from (TSI), or writes to (TSO) a single address specified by Transfer Address. The number of words transferred is STC.

Note: This instruction may be used primarily for test purposes.

---

BOPS, Inc.

TSx.Block

BOPS, Inc. - Manta SYSSIM 2.31

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|----|----|----|----|----|----|----|----|----|----|----|----|----|----|----|----|----|----|----|----|----|----|----|----|----|----|----|----|----|----|----|----|
| 11 | | 00 | | | 1 | I/O | | 00 | | | | Addr Mode = 0001 | | | | X | | 0 | | 00 | | | | System Transfer Count (STC) | | | | | | | |
| Transfer Address |||||||||||||||||||||||||||||||||

STC              System Transfer Count. Number of data items to transfer.

Transfer Address     Start address of the transfer

Description

This instruction performs either a read from (TSI), or a write to (TSO) a sequence of contiguous addresses starting with "Transfer Address" for "STC" addresses.

TSx.Stride

BOPS, Inc. - Manta SYSSIM 2.31

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 11 | | 00 | | 1 | | I/O | | 00 | | | | Addr Mode = 0010 | | | | X | | 0 | | 00 | | | | System Transfer Count (STC) | | | | | | | |
| Transfer Address |||||||||||||||||||||||||||||||||
| Index Count (Hold) Range: 1 to 65536 |||||||||||||||| Base Update (Stride) Range: 1 to 65536 ||||||||||||||||

STC                  System Transfer Count. Number of data items to transfer.

Transfer Address     Start address of the transfer

Index Count (Hold)    Number of contiguous data items in a block

Base Update (Stride)   Distance between successive blocks. Units are of "data type" size.

Description

In stride address mode data is accessed in contiguous blocks of "Index Count" words where each block start address is separated from the next by "Base Update" (Stride) words. An example pattern for base update value of 8 and an index count ("hold") value of 4 is shown below. The number of words transferred is specified by the STC parameter.

*Figure 2. Example of access pattern for Stride address control with Stride = 8, Hold = 4*

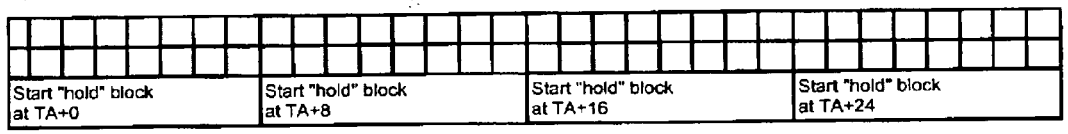

| Start "hold" block at TA+0 | Start "hold" block at TA+8 | Start "hold" block at TA+16 | Start "hold" block at TA+24 |

BOPS, Inc.

TSx.Circular

BOPS, Inc. - Manta SYSSIM 2.31

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 11 | | 00 | | 1 | | I/O | | 00 | | | | Addr Mode = 0101 | | | | X | | 0 | | 00 | | | | System Transfer Count (STC) | | | | | | | |
| Circular Buffer Base Address (CBBA) |||||||||||||||||||||||||||||||||
| Circular Buffer Size (BufSize) Range: 1 to 65536 |||||||||||||||| Init Index Range: 0 to 65535 ||||||||||||||||

STC                             System Transfer Count. Number of data items to transfer.

Circular Buffer Base Address   Start address of circular buffer.

Circular Buffer Size             Number of elements in the circular buffer.

Init Index                          Initial offset into the circular buffer. Offset is in "data type" units.

Description

The Circular addressing mode specifies a circular buffer whose base address is "Circular Buffer Base Address" (CBBA) and whose size is "Circular Buffer Size" (BufSize). The Initial offset into the buffer may be specified by "Init Index". "STC" successive elements are transferred such that the address is always maintained between CBBA and CBBA+BufSize-1, inclusive.

Given that Index is the current offset into the circular buffer (relative to CBBA) the operation is defined as:

```
Access Address = CBBA + Index
If ( (Index + 1 - BufSize) == 0 )
Index = 0;
else
Index = Index + 1;
```

If the Initial Index is specified as larger than BufSize, then the access pattern is unspecified.

TSx.Update

BOPS, Inc. - Manta SYSSIM 2.31

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 11 | | 01 | | 1 | | I/O | | 0 (reserved) | | | | Update Type | | X | 0 | 00 | | | | System Transfer Count (STC) (if update STC specified in Update Type) | | | | | | | | | | | |
| System Transfer Address (STA) (if address update specified in Update Type) | | | | | | | | | | | | | | | | | | | | | | | | | | | | | | | |

STC     System Transfer Count. This field is used when Update Type specifies a STC update.

STA     System Transfer Address. This word of the instruction is included when STA update is specified.

L     Lock in the transfer once started.

X     Begin transfer after loading this instruction

Update Type     Specifies what parts (if any of the instruction currently in the STU are to be updated)

00 = If STC is zero, reload with ISTC (initial STC) value. If STC is non-zero do not update. (This allows a transfer to be continued with no changes)
01 = Update (new) STC.
10 = Update (new) STA. If STC is zero, reload with initial (ISTC) value, otherwise leave STC at its current value.
11 = Update (new) STC and STA I/O     0 = Inbound
1 = Outbound

Description

This instruction optionally updates the STU with a new transfer count and transfer address.

If 'Update Type' is 00, then the STC is reloaded from ISTC if it is zero, or left unchanged if it is non-zero. If the STU is currently in the IDLE state, then it is enabled to run with its current parameters if 'X' is 0 or placed in the transfer state if 'X' is 1.

DMA Instruction Set Reference - Control Instructions

BOPS, Inc. - Manta SYSSIM 2.31

Table of Contents

1 Control Instructions

1.1 Transfer Control Events

---

1 Control Instructions

Control instructions are executed by the Instruction Control Unit. They are used to perform instruction stream control (branching) and synchronization with other processors or devices on the ManArray Control Bus (MCB). Synchronization operations rely on the generation and use of condition information produced by external inputs, Transfer Unit status and data operations.

---

1.1 Transfer Control Events

There are two types of conditions which can be used to control transfers and generate synchronization signals: internal and external.

Internal conditions are actually events generated during the processing of transfer instructions. They are a combination of one or both transfer counters becoming equal to zero, or the transfer PC (TPC) becoming equal to the WAITPC. These events may be used to generate synchronization signals, which may be sent via MCB or dedicated wire (or both).

External conditions are reflected in the Semaphore registers S0 - S3. These registers are updated by commands received across the MCB or by control instructions. They may then be used to control the instruction flow.

Instructions that use conditions to control their behavior have a common condition field format, shown below. Twelve conditions are determined by comparing a specified 8-bit semaphore register with zero, and setting the condition based on this result. Two of the conditions test for either the CTC or STC being equal to zero, and one condition is "always" for unconditional jumps.

Condition Table

| SCondition | Semaphore condition. |
|---|---|
| | 0000 = Always |
| | 0001 = Equal |
| | 0010 = Not equal |
| | 0011 = Higher than |
| | 0100 = Higher than or equal |
| | 0101 = Lower than |
| | 0110 = Lower than or equal |
| | 0111 = CTUeot |
| | 1000 = STUeot |
| | 1001 = !CTUeot (CTC not zero) |
| | 1010 = !STUeot (STC not zero) |
| | 1011 = Greater than or equal |
| | 1100 = Greater than |
| | 1101 = Less than or equal |
| | 1110 = Less than |
| | 1111 = reserved |

Branching Instructions

TPC-relative Branch Encoding

| 31 30 | 29 28 27 26 25 24 | 23 22 21 20 | 19 18 17 16 | 15 14 13 12 11 10 09 08 07 06 05 04 03 02 01 00 |
|---|---|---|---|---|
| 00 | Branch Op | Control (if any) | SCondition | TPCOffset |

Direct Address Branch Encoding

| 31 30 | 29 28 27 26 25 24 | 23 22 21 20 | 19 18 17 16 | 15 14 13 12 11 10 09 08 07 06 05 04 03 02 01 00 |
|---|---|---|---|---|
| 00 | Branch Op | Control (if any) | SCondition | Reserved |
| Direct System Address (32-bit) ||||

Description

The branching instructions are of five basic types:

- jump-relative
- jump-direct
- call-relative
- call-direct
- return (from call)

All branch instructions are conditional, with one of the conditions being "always" to implement unconditional branching.

BOPS, Inc.

JMP - JUMP TPC-relative (GF conditional)

BOPS, Inc. - Manta SYSSIM 2.31

Encoding

| 31 30 | 29 28 27 26 25 24 23 22 | 21 20 | 19 18 17 16 | 15 14 13 12 11 10 09 08 07 06 05 04 03 02 01 00 |
|---|---|---|---|---|
| 00 | 000100 | SemID | Sem Op | SCondition | TPCOffset |

Note: column count above represents: 00 | 000100 | SemID | SemOp | SCondition | TPCOffset

Description

TPCOffset    Offset (in 32-bit words) of next instruction relative to current value of TPC.

SCondition    (See the Semaphore Condition Table.)

SemID    Semaphore ID. This specifies which semaphore is used in the condition comparison.
          00 = S0
          01 = S1
          10 = S2
          11 = S3

Sem Op  Operation to perform on semaphore if branch taken:
 00 = No change to semaphore
 01 = Decrement the semaphore by 1
 10 = Increment the semaphore by 1
 11 = Clear to Zero The JMP instruction causes the TPC to be updated to a value equal to TPC + TPCOffset if the specified condition is TRUE. (Unconditional jumps use condition condition code 0000).

The TPCOffset points to a 32-bit word address, therefore the two least significant bits are assumed to be zero and appended to the offset given in the instruction (I.e. the branch range is -32768 to +32767 words relative to the current TPC).

The Semaphore operation allows the specified semaphore to be modified when the associated condition evaluates TRUE.

BOPS, Inc.

JMPD - JUMP Direct (GF conditional)

BOPS, Inc. -   Manta  SYSSIM 2.31

Encoding

| 31 30 | 29 28 27 26 25 24 | 23 22 | 21 20 | 19 18 17 16 | 15 14 13 12 11 10 09 08 07 06 05 04 03 02 01 00 |
|---|---|---|---|---|---|
| 00 | 001000 | SemID | Sem Op | SCondition | Reserved |
| Direct (32-bit System) Address | | | | | 0 0 |

Description

Direct Address   Target address of branch. 32-bit system address.

SCondition   (See the Semaphore Condition Table.)

SemID   Semaphore ID. This specifies which semaphore is used in the condition comparison.
 00 = S0
 01 = S1
 10 = S2
 11 = S3

Sem Op   Operation to perform on semaphore if branch taken:
 00 = No change to semaphore
 01 = Decrement the semaphore by 1
 10 = Increment the semaphore by 1
 11 = Clear to Zero The JMPD instruction, when the condition is TRUE, causes the TPC to be updated with the value of the second word of this instruction. Since this is an absolute System address, it is assumed to be a byte address and therefore the least significant two bits are always forced to zero.

The Semaphore operation allows the specified semaphore to be modified when the associated condition evaluates TRUE.

CALL - CALL TPC-relative (GF conditional)

Encoding

| 31 30 | 29 28 27 26 25 24 | 23 22 | 21 20 | 19 18 17 16 | 15 14 13 12 11 10 09 08 07 06 05 04 03 02 01 00 |
|---|---|---|---|---|---|
| 00 | 001100 | SemID | Sem Op | SCondition | TPCOffset |

Description

TPCOffset  Offset (in 32-bit words) of next instruction relative to current value of TPC. The branch range is -32768 to +32767 words relative to the current TPC SCondition  (See the Semaphore Condition Table.)

SemID  Semaphore ID. This specifies which semaphore is used in the condition comparison.
00 = S0
01 = S1
10 = S2
11 = S3

Sem Op  Operation to perform on semaphore if branch taken:
00 = No change to semaphore
01 = Decrement the semaphore by 1
10 = Increment the semaphore by 1
11 = Clear to Zero If the specified condition is TRUE, the CALL instruction causes the address of the next instruction to be saved in the LTPC register (return address) and the TPC is then updated to a value equal to TPC+TPCOffset. If the specified condition is false, the CALL instruction is treated as a NOP. (Unconditional CALLs are specified with the condition code 0000).

The Semaphore operation allows the specified semaphore to be modified when the associated condition evaluates TRUE.

BOPS, Inc.

CALLD - CALL Direct (GF conditional)

BOPS, Inc. -  Manta  SYSSIM 2.31

Encoding

| 31 30 | 29 28 27 26 25 24 | 23 22 | 21 20 | 19 18 17 16 | 15 14 13 12 11 10 09 08 07 06 05 04 03 02 01 00 | | |
|---|---|---|---|---|---|---|---|
| 00 | 010000 | SemID | Sem Op | SCondition | Reserved | | |
| Direct (32-bit System) Address | | | | | | 0 | 0 |

Description

| | |
|---|---|
| Direct Address | Target address of branch. 32-bit system address. |
| SCondition | (See the Semaphore Condition Table.) |
| SemID | Semaphore ID. This specifies which semaphore is used in the condition comparison.<br>00 = S0<br>01 = S1<br>10 = S2<br>11 = S3 |
| Sem Op | Operation to perform on semaphore if branch taken:<br>00 = No change to semaphore<br>01 = Decrement the semaphore by 1<br>10 = Increment the semaphore by 1<br>11 = Clear to Zero |

If the specified condition is TRUE, the CALL instruction causes the address of the next instruction to be saved in the LTPC register (return address) and the 32-bit value specified in the instruction to be copied to the TPC.

If the specified condition is false, the CALL instruction is treated as a NOP. (Unconditional CALLs are specified with the condition code 0000).

The Semaphore operation allows the specified semaphore to be modified when the associated condition evaluates TRUE.

BOPS, Inc.

RET - Return from Subroutine

BOPS, Inc. - Manta SYSSIM 2.31

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 00 | | | 010100 | | | | | SemID | | Sem Op | | SCondition | | | | Reserved | | | | | | | | | | | | | | | |

| | |
|---|---|
| SCondition | (See the Semaphore Condition Table.) |
| SemID | Semaphore ID. This specifies which semaphore is used in the condition comparison.<br>00 = S0<br>01 = S1<br>10 = S2<br>11 = S3 |
| Sem Op | Operation to perform on semaphore if branch taken:<br>00 = No change to semaphore<br>01 = Decrement the semaphore by 1<br>10 = Increment the semaphore by 1<br>11 = Clear to Zero |

The RET instruction, when the specified condition is TRUE, loads the TPC from the LTPC register and continues fetching instructions from the new instruction address.

The Semaphore operation allows the specified semaphore to be modified when the associated condition evaluates TRUE.

CLEAR, RESTART and NOP - Transfer State Control Instructions

SYSSIM 2.31

| 31 30 | 29 28 27 26 25 24 | 23 22 21 20 | 19 18 17 16 | 15 14 13 12 11 10 09 08 07 06 05 04 03 02 01 00 |
|---|---|---|---|---|
| 00 | 000000 | Reserved (0) | Exec Control Op | Reserved (0) |

Exec Control Op  
0000 = NOP  
0001 = Clear CTU  
0010 = Clear STU  
0011 = Clear both CTU and STU  
0100 = Restart CTU  
1000 = Restart STU  
1100 = Restart CTU and STU This instruction has a dual purpose. When neither transfer unit is specified, this instruction is a NOP. This instruction is used primarily to force the STU into an IDLE state. When the STU is in the IDLE state it may receive read/write requests to its MDB slave address (specified in the MDBSAR -MDB Slave Address Register). A read request (when STU is IDLE) accesses the ODQ, while a write request accesses the IDQ. This mode of operation is used for DMA-DMA transfers and I/O device transfers.

BOPS, Inc.

PEXLAT -- Load PE Translate Table

BOPS, Inc. - Manta SYSSIM 2.31

| 31 30 | 29 28 27 26 25 24 | 23 22 21 20 | 19 18 17 16 15 14 13 12 11 10 09 08 | 07 06 05 04 03 02 01 00 |
|---|---|---|---|---|
| 00 | 0110 | MA Type 01 | (Reserved for 2x4 Translate Table) | 2x2Table |

2x2Table    Contains a table of two bit PE IDs. Two bits of the Core Transfer Address which specify the base of each PE's memory are applied as an index into this table during PE Address modes. The translated value is then used to perform the memory access. With this approach, PEs may be accessed in any order for these modes. Other addressing modes do not use the PE translation table.

MA Type    ManArray Type specifies the configuration targeted, and the size of the table.  
00 = 1x2  
01 = 2x2  
10 = 2x4  
11 = 4x4

The format of entries in the 2x2 PE translate table is shown below:

| 7 | 6 | 5 | 4 | 3 | 2 | 1 | 0 |
|---|---|---|---|---|---|---|---|
| Output ID for PE3 input ID | | Output ID for PE2 input ID | | Output ID for PE1 input ID | | Output ID for PE0 input ID | |

For example, when the input address bits specify '00' (PE 0) the first entry of the table is returned ("Output ID for PE0 Input ID") and substituted for them before applying the address to a core memory.

BOPS, Inc.

BITREV - Load Bit-Reverse Address Translation code

Encoding

| 31 30 | 29 28 27 26 | 25 24 | 23 22 21 20 19 18 17 16 15 14 13 12 11 10 09 08 07 06 05 | 04 03 02 01 00 |
|---|---|---|---|---|
| 00 | 1011 | 00 | Reserved | Bit Reverse Code |

Description

Bit Reverse Code
This code specifies how the DMA BUS address bits will be translated. The default is "no translation" (code is 0). Other codes support various options allowing efficient transfer and re-ordering of data that is the output or input to FFT calculations.
00000 = No translation
00001 = 256 element FFT, radix 2, reverse-pe order to/from in-order vector
00010 = 512 element FFT, radix 2, reverse-pe order to/from in-order vector
00011 = 1024 element FFT, radix 2, reverse-pe order to/from in-order vector
00100 = 2048 element FFT, radix 2, reverse-pe order to/from in-order vector
00101 = 4096 element FFT, radix 2, reverse-pe order to/from in-order vector
00110 = 8192 element FFT, radix 2, reverse-pe order to/from in-order vector
00111 = 256 element FFT, radix 4 reverse-pe order to/from in-order vector
01000 = 1024 element FFT, radix 4 reverse-pe order to/from in-order vector
01001 = 4096 element FFT, radix 4 reverse-pe order to/from in-order vector
01010 = 256 element FFT, radix 4 reverse-pe order to/from reverse-order vector
01011 = 1024 element FFT, radix 4 reverse-pe order to/from reverse-order vector
01100 = 4096 element FFT, radix 4 reverse-pe order to/from reverse-order vector
01101 = 256 element FFT, radix 8, reverse-pe order to/from in-order vector
01110 = 2048 element FFT, radix 8 reverse-pe order to/from in-order vector
01111 = 256 element FFT, radix 8, reverse-pe order to/from In-order vector
10000 = 2048 element FFT, radix 8 reverse-pe order to/from in-order vector The BITREV instruction is designed to configure the DMA bus addressing in to allow direct removal of FFT output data (in bit-reversed order) from PE memories to an in-order format in an external memory or device. It also allows FFT data in a reverse-order on the PE memories to be collected and transferred to a reverse-order vector in external memory.

A DMA instruction sequence such as the following would be used to gather transformed FFT data (in reversed order) and transferred to a vector externally:

```
pexlat {3,2,1,0} ;              ! Bit-reverse the PE addresses
bitrev  code = 8;               ! Assumes 1024 element FFT, radix 4,
                                ! bit-reversed PE order to in-order memory
tco.blockcyclic tc=1024,        ! PE block-cyclic transfer from PE memory,
                peaddr=0x0000,  ! from offset zero in each PE.
                pecnt=4,
                loop=BIP,
                bu = 0,
                bc = 1,
                iu = 1,
                ic = 512;
                                ! Block transfer to external memory
tso.block.x  tc=1024,           ! from DMA fifo.
             addr=xxxxxxxx;
pexlat {0,1,2,3} ;              ! Restore PE translate
bitrev code=none ;              ! Restore Bitrev setting to "none"
```

BOPS, Inc.

Appl. No. 11/827,548
Preliminary Amdt. dated January 10, 2011

WAIT - Wait While Condition is TRUE

BOPS, Inc. - Manta SYSSIM 2.31

| 31 30 29 28 27 26 25 24 | 23 22 21 20 | 19 18 17 16 15 14 13 12 11 10 09 08 | 07 06 05 04 03 02 01 00 |
|---|---|---|---|
| 00    0111   0   0   Sem ID   Sem Op | SCondition | Reserved | Compare Val |

SemID      Semaphore ID. This specifies which semaphore is used in the condition comparison.
                 00 = S0
                 01 = S1
                 10 = S2
                 11 = S3

SCondition    Semaphore condition.
                 0000 = Always (wait until explicit command causes a processing state change)
                 0001 = Equal
                 0010 = Not equal
                 0011 = Higher than
                 0100 = Higher than or equal
                 0101 = Lower than
                 0110 = Lower than or equal
                 0111 = CTUeot
                 1000 = STUeot
                 1001 = !CTUeot (CTC not zero)
                 1010 = !STUeot (STC not zero)
                 1011 = Greater than or equal
                 1100 = Greater than
                 1101 = Less than or equal
                 1110 = Less than
                 1111 = reserved SemOp       00 = No change to semaphore when wait condition is/becomes FALSE
                 01 = Decrement semaphore by 1 when wait condition is/becomes FALSE
                 10 = Increment semaphore by 1 when the wait condition is/becomes FALSE
                 11 = Clear to Zero when the wait condition is/becomes FALSE Compare Val    Immediate 8-bit value which is subtracted from the specified semaphore value to obtain the comparison conditions.

The WAIT instruction causes instruction fetching to stop while the specified wait condition is TRUE. The wait condition is specified by the relationship between a specified semaphore (S0, S1, S2 or S3), and an 8-bit immediate value specified in the instruction. The immediate value is subtracted from the semaphore and the flags are set to establish their relationship. The conditions allow the values to be interpreted as either signed or unsigned numbers. When the condition specified is (or becomes) false, the specified semaphores are updated according to the update control fields (bits [7:0]).

NOTE: Initial implementation may only allow "no change" and "decrement" update options for the semaphore specified in the SemID field (rather than any/all semaphores).

BOPS, Inc.

SIGNAL - Conditional Signal of Interrupt, Message, Semaphore

BOPS, Inc. - Manta SYSSIM 2.31

| 31 30 29 28 27 26 | 25 24 | 23 22 21 20 | 19 18 17 16 15 | 14 13 12 | 11 10 09 08 | 07 | 06 | 05 04 | 03 02 01 00 |
|---|---|---|---|---|---|---|---|---|---|
| 00    1000 | Sigmod | Cond Sem ID   Cond Sem Op | SCondition | Inc Dreg | Reserved | Sem ID   Sem Op | Sig1   Sig0 | Areg | Dreg |
| Immediate Address (present only when Smod = x10 , x11) ||||||||||
| Immediate Data (present only when Smod = x01, x11) ||||||||||

59

| Field | Description |
|---|---|
| IncDreg | If Sigmod=00 or Sigmod = 10, and Dreg is a General Register then:<br>0 = No post-increment of General Register (GR0-GR3 only)<br>1 = Post-increment General Register (GR0-GR3 only) |
| Sigmod | 00 = Indirect Address (address in reg 'Areg'), Indirect Data (data in reg 'Dreg')<br>01 = Indirect Address (address in reg 'Areg'), Immediate Data (next inst word)<br>10 = Immediate Address (next inst word), Indirect Data (data in reg 'Dreg')<br>11 = Immediate Address (next inst word), Immediate data (word following immediate address). |
| Cond SemID | Semaphore ID. This specifies which semaphore is used in the condition comparison.<br>00 = S0<br>01 = S1<br>10 = S2<br>11 = S3 |
| Cond SemOp | Specifies operation to perform on the semaphore if condition is TRUE.<br>00 = No change to semaphore<br>01 = Decrement the semaphore by 1<br>10 = Increment the semaphore by 1<br>11 = Clear semaphore to Zero |
| SCondition | Condition which, if TRUE, allows the SIGNAL to occur. Same as WAIT conditions, and assumes a comparison with zero. (See the Semaphore Condition Table.) |
| Sig0 | 1 = Assert Interrupt Signal 0 high for two clock cycles, then low.<br>0 = Do not assert. |
| Sig1 | 1 = Assert Interrupt Signal 1 high for two clock cycles, then low.<br>0 = Do not assert |
| Areg | When SigMod=00 or SigMod=01, specifies an internal register (GR0-GR3) whose contents to which data is to be sent. Not used if Dreg = '1111' |
| Dreg | When SigMod = 00 or SigMod = 10 (Indirect Data), this field specifies the register to be sent as message data. If this field contains '1111', then no message is sent regardless of the value of SigMod.<br>0000 = GR0<br>0001 = GR1<br>0010 = GR2<br>0011 = GR3<br>1000 = TSR0<br>1001 = TSR1<br>1010 = TSR2<br>1011 = TSR3<br>1100 = TPC<br>1101 = SEM<br>1111 = Do Not send Message |
| Sem ID | Specifies a semaphore to update when signal is performed.<br>00 = Semaphore 0<br>01 = Semaphore 1<br>10 = Semaphore 2<br>11 = Semaphore 3 |
| Sem Op | 00 = No change to semaphore<br>01 = Decrement the semaphore by 1<br>10 = Increment the semaphore by 1<br>11 = Clear semaphore to zero |

LIMEAR - Load Immediate Event Action Registers

| 31 30 | 29 28 27 26 | 25 | 24 | 23 22 | 21 20 | 19 18 | 17 16 | 15 | 14 13 12 | 11 | 10 | 09 | 08 | 07 | 06 05 04 | 03 | 02 | 01 | 00 |
|---|---|---|---|---|---|---|---|---|---|---|---|---|---|---|---|---|---|---|---|
| 00 | 1001 | 0 | 0 | STU Restart Sem | STU Restart CC | CTU Restart Sem | CTU Restart CC | E1 IncDreg | Reserved | E1 TPCWait | E1 TCZero | E1 STUeot | E1 CTUeot | E0 IncDreg | Reserved | E0 TPCWait | E0 TCZero | E0 STUeot | E0 CTUeot |
| E1 S3 Op | E1 S2 Op | E1 S1 Op | E1 S0 Op | E1 Sig1 | E1 Sig0 | E1 Areg | E1 Dreg | | | E0 S3 Op | E0 S2 Op | E0 S1 Op | E0 S0 Op | E0 Sig1 | E0 Sig0 | E0 Areg | | E0 Dreg | |

| | |
|---|---|
| E0CTUeot | 1 = trigger E0 action(s) when CTUeot becomes TRUE (CTC: 1·0) |
| E0STUeot | 1 = trigger E0 action(s) when STUeot becomes TRUE (STC: 1·0) |
| E0TCzero | 1 = trigger E0 action(s) when both CTC AND STC become zero. (The later counter to reach zero triggers the action. If this bit is set, E0CTUeot and E0STUeot are ignored. |
| E0TPCWait | 1 = trigger E1 action(s) when TPC becomes equal WAITPC. |
| E0IncDreg | 0 = No post-increment<br>1 = Post-Increment Dreg if it is a General Register (GR0-GR3 only) |
| E1CTUeot | 1 = trigger E1 action(s) when CTUeot becomes TRUE (CTC: 1·0) |
| E1STUeot | 1 = trigger E1 action(s) when STUeot becomes TRUE (STC: 1·0) |
| E1TCzero | 1 = trigger E1 action(s) when both CTC AND STC become zero. |
| E1TPCWait | 1 = trigger E0 action(s) when TPC becomes equal WAITPC. |
| E0IncDreg | 0 = No post-increment<br>1 = Post-Increment Dreg If it is a General Register (GR0-GR3 only) |
| E0 Dreg | Specifies a register to be sent (if not '1111') as message data when E0 event occurs.<br>0000 = GR0<br>0001 = GR1<br>0010 = GR2<br>0011 = GR3<br>1000 = TSR0<br>1001 = TSR1<br>1010 = TSR2<br>1011 = reserved<br>1100 = TPC<br>1101 = SEM<br>1111 = Do Not send Message |
| E0 Areg | Specifies a register which provides the message address when E0 event occurs.<br>00 = GR0<br>01 = GR1<br>10 = GR2<br>11 = GR3 |
| E0Sig0 | 0 = Do not assert interrupt signal 0.<br>1 = Assert interrupt signal 0 active 1 for 2 cycles when E0 event occurs |

| | |
|---|---|
| E0Sig1 | 0 = Do not assert interrupt signal 1.<br>1 = Assert Interrupt signal 1 active 1 for 2 cycles when E0 event occurs |
| E0 S0-S3 Op | Each 2-bit field specifies the action when E0 event occurs, one field per semaphore:<br>00 = No change to semaphore when wait condition becomes FALSE<br>01 = Decrement the semaphore by 1 when wait condition becomes FALSE<br>10 = Increment the semaphore by 1 when the wait condition becomes FALSE<br>11 = Clear semaphore to Zero |
| E1 Dreg | Specifies a register to be sent (if not '1111') as message data when E1 event occurs.<br>0000 = GR0<br>0001 = GR1<br>0010 = GR2<br>0011 = GR3<br>1000 = TSR0<br>1001 = TSR1<br>1010 = TSR2<br>1011 = reserved<br>1100 = TPC<br>1101 = SEM<br>1111 = Do Not send Message |
| E1 Areg | Specifies a register which provides the message address when E1 event occurs.<br>00 = GR0<br>01 = GR1<br>10 = GR2<br>11 = GR3 |
| E1Sig0 | 0 = Do not assert interrupt signal 0.<br>1 = Assert interrupt signal 0 active 1 for 2 cycles when E1 event occurs |
| E1Sig1 | 0 = Do not assert interrupt signal 1.<br>1 = Assert Interrupt signal 1 active 1 for 2 cycles when E1 event occurs |
| E1 S0-S3 Op | Each 2-bit field specifies the action when E1 event occurs, one field per semaphore:<br>00 = No change to semaphore when wait condition becomes FALSE<br>01 = Decrement the semaphore by 1 when wait condition becomes FALSE<br>10 = Increment the semaphore by 1 when the wait condition becomes FALSE<br>11 = Clear semaphore to Zero |
| CTU Restart CC | 00 = if (CTU Restart Sem != 0) Restart CTU transfer and decrement CTU Restart Sem<br>01 = reserved<br>10 = reserved<br>11 = No Restart operation |
| CTU Restart Sem | Specifies the semaphore being tested for the CTU Restart CC operation<br>00 = S0<br>01 = S1<br>10 = S2<br>11 = S3 |
| STU Restart CC | 00 = if (STU Restart Sem != 0) Restart STU transfer and decrement STU Restart Sem<br>01 = reserved<br>10 = reserved<br>11 = No Restart operation |
| STU Restart Sem | Specifies the semaphore being tested for the STU Restart CC operation<br>00 = S0<br>01 = S1<br>10 = S2<br>11 = S3 |

This instruction loads the EAR0 and EAR1 registers which allow various processor actions to be generated based on specified transfer events. (See EAR0 and EAR1 register descriptions).

LIMGR - Load Immediate General Register(s)   BOPS, Inc. - Manta SYSSIM 2.31

Encoding

| 31 30 | 29 28 27 26 25 24 | 23 22 | 21 20 | 19 | 18 | 17 | 16 | 15 14 13 12 11 10 09 08 07 06 05 04 03 02 01 00 |
|---|---|---|---|---|---|---|---|---|
| 00 | 1010 | 0 0 | Reserved | GR3 | GR2 | GR1 | GR0 | Reserved |
| GR0 value (if GR0 = 1), else this word is not present ||||||||||
| GR1 value (if GR0 = 1), else this word is not present ||||||||||
| GR2 value (if GR0 = 1), else this word is not present ||||||||||
| GR3 value (if GR0 = 1), else this word is not present ||||||||||

Description

GR0     1 = Immediate value (32-bit) to place in GR0 is assumed to follow (as shown)
        0 = No value expected GR1     1 = Immediate value (32-bit) to place in GR1 is assumed to follow (as shown)
        0 = No value expected GR2     1 = Immediate value (32-bit) to place in GR2 is assumed to follow (as shown)
        0 = No value expected GR3     1 = Immediate value (32-bit) to place in GR3 is assumed to follow (as shown)
        0 = No value expected Reg Cnt     Number of registers that will be loaded This instruction is used to load one or more of the general registers GR0-GR3. This registers can be used as address or data registers, primarily for data flow synchronization signals and messages.

BOPS, Inc.

LIMSEM8- Load Immediate Semaphore Registers   BOPS, Inc. - Manta SYSSIM 2.31

| 31 30 | 29 28 27 26 25 24 | 23 22 | 21 20 | 19 | 18 | 17 | 16 | 15 14 13 12 11 10 09 08 07 06 05 04 03 02 01 00 |
|---|---|---|---|---|---|---|---|---|
| 00 | 1010 | 1 0 | Reserved | S3En | S2En | S1En | S0En | Reserved |
| S3 Value | | S2 Value | | | | S1 Value | | S0 Value |

S3En - S0En    Semaphore Load enables.
               0 = Do not load corresponding semaphore register
               1 = Load corresponding semaphore register S3 Value - S0 Value    Immediate data values to be loaded (if enabled) into semaphore registers.

This instruction loads the semaphore register with 8-bit immediate values. Only those semaphores selected for loading will be updated.

BOPS, Inc.

LIMSEM4- Load Immediate Semaphore Registers (4-bit, with optional 1 or 0 extension)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|----|----|----|----|----|----|----|----|----|----|----|----|----|----|----|----|----|----|----|----|----|----|----|----|----|----|----|----|----|----|----|----|
| 00 | | 1010 | | | | 1 | 1 | S3 Ext | S2 Ext | S1 Ext | S0 Ext | S3 En | S2 En | S1 En | S0 En | S3 Value | | | | S2 Value | | | | S1 Value | | | | S0 Value | | | |

S3Ext - S0Ext    Extension option (used for those values which are enabled to load):
0 = Load value and clear upper 4 bits to zero
1 = Load value and set upper 4 bits to '1111'

S3En - S0En    Semaphore Load enables.
0 = Do not load corresponding semaphore register
1 = Load corresponding semaphore register S3 Value - S0 Value    Immediate 4-bit data values to be loaded (if enabled) into semaphore registers.

This instruction loads the semaphore register with 4-bit immediate values which may be optionally extended with either zeros or ones. Only those semaphores selected for loading will be updated.

BOPS, Inc.

ManArray Control Bus

BOPS, Inc. -    Manta SYSSIM 2.31

Table of Contents

Bus Interfaces
ManArray Control Bus
MCB to MDB Bus Bridge

Bus Interfaces

The ManArray architecture uses two primary bus interfaces: the ManArray Data Bus (MDB), and the ManArray Control Bus (MCB). The MDB provides for high volume data flow in and out of the DSP array. The MCB provides a path for peripheral access and control. The width of either bus varies between different implementations of ManArray coprocessor cores. The width of the MDB is set according to the data bandwidth requirements of the array in a given application, as well as the overall complexity of the on-chip system.

ManArray Control Bus

The MCB is a 32-bit, single-beat, lockable control bus (up to 15 masters/slaves) that runs at core clock speeds, i.e. on the same clock as the DSP array. This bus represents the control interface from the outside world to the BOPS core. The bus protocol is compatible with the ARM® AHB. The data bus is 32 bits wide. Within a ManArray coprocessor core, the bus masters are ManArray SP DMMU, SP IMMU, and the DMA. ManArray slaves on this bus are the ManArray SP register space, and the DMA control register space. This bus can operate in either little or big endian mode. Multiple ManArray DSPs can be supported on the MCB. The 64 Mbyte ManArray Aperture is architected to support 16 DSPs, each with its own DMA. The MCB to MDB bridge slave on the MCB decodes and accepts almost all of the MCB address space and maps transfers to the MDB with a 1:1 address translation. The ManArray Aperture is not decoded by the MCB to MDB bridge slave.

MCB to MDB Bus Bridge

The bus bridge provides a slave on the MCB that accepts transfers within a very large aperture. In essence, all of the 32 bit MCB address is picked up by the bus bridge and mapped to the MDB, except for the 64MByte ManArray aperture containing the ManArray DSP and DMA state. These transfers are reflected through a master on the MDB to the various devices on the MDB. Notice that an address remapping occurs during this process such that accesses to the MCB at offset 0x14000000 are mapped to the SDRAM at location 0x00000000 on the MDB. This relocation occurs across the 64MBytes from 0x14000000 to 0x17FFFFFF so that the SDRAM aperture on the MDB is visible from the MCB.

BOPS, Inc.

ManArray Data Bus

BOPS, Inc. - Manta SYSSIM 2.31

Table of Contents

Bus Interfaces
ManArray Data Bus

Bus Interfaces

The ManArray architecture uses two primary bus interfaces: the ManArray Data Bus (MDB), and the ManArray Control Bus (MCB). The MDB provides for high volume data flow in and out of the DSP array. The MCB provides a path for peripheral access and control. The width of either bus varies between different implementations of ManArray co-processor cores. The width of the MDB is set according to the data bandwidth requirements of the array in a given application, as well as the overall complexity of the on-chip system.

ManArray Data Bus

The MDB is a 64-bit, bursting/split capable, non-locking data bus (up to 15 masters/slaves) on-chip bus that runs at core clock speeds, i.e. on the same clock as the DSP array. The bus protocol is compatible with the ARM® AHB. The width of this data bus depends on the bandwidth requirements of the DSP array(s) and the requirements of other on-chip system components. For example, a single MDB may support several ManArray cores, and has to provide sufficient bandwidth for all DSP traffic as well as the host processor and various other on-chip I/O devices. The only ManArray DSP Core Master on this bus is the DMA engine. Typically, one MCB to MDB bus bridge is supported regardless of the number of ManArray DSPs on the chip. Address space allocation on this bus is defined by the SOC architecture. The sources and sinks of DSP data streams should be resident on this bus so that the DMA data transfers can take place over this bus.

MDB Address Space

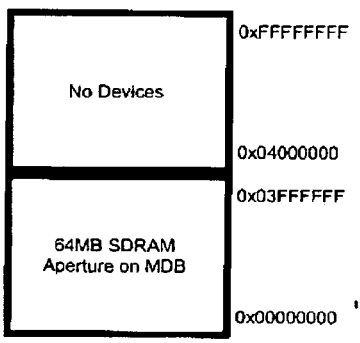

BOPS, Inc.

Manta SDRAM  BOPS, Inc. - Manta SYSSIM 2.31

Table of Contents

The SDRAM Block

The SDRAM Block

The SDRAM block provides bulk memory service via the MDB. The 64MByte SDRAM interface is accessed when a read or write cycle is received in the first 64Mbytes of the SDRAM aperture on both of its ports. Thus the SDRAM is a slave device on the MDB.

NOTE: The BOPS System Simulator defaults to 64Kwords of SDRAM. Users can expand up to 64Mbytes via File I/O Control Blocks.

While the present invention has been disclosed in the context of various aspects of presently preferred embodiments, it will be recognized that the invention may be suitably applied to other environments and applications consistent with the claims which follow.

We claim:

1. A method for controlling direct memory access (DMA) transfers between a core memory and a system memory, the method comprising:
    loading DMA transfer addresses for a specified data type in response to execution of a DMA transfer program by a DMA processor circuit located in a core device; and
    transferring data between locations in the core memory and the system memory based on the DMA transfer addresses according to the execution of the DMA transfer program.

2. The method of claim 1 further comprising:
    initializing the DMA processor circuit by setting and clearing a DMA signal to hold the DMA processor circuit in a reset state.

3. The method of claim 1, wherein the DMA transfer addresses comprise at least two addresses, one address identifying a start of a block of data in the core memory and one address identifying a start of a block of data in the system memory.

4. The method of claim 1 wherein executing the DMA transfer program further comprises:
    initializing a DMA program counter associated with the DMA processor circuit to a start of a list of DMA instructions comprising the DMA transfer program;
    fetching the DMA instructions; and
    executing the DMA instructions in the DMA processor circuit.

5. The method of claim 1 further comprising:
    fetching the DMA transfer program from the core memory.

6. The method of claim 1, wherein the execution of the DMA transfer program further comprises:
    transferring the data from the system memory to the DMA processor circuit; and
    transferring the data from the DMA processor circuit to interleaved address locations in a plurality of core data memories comprising the core memory.

7. The method of claim 1, wherein the execution of the DMA transfer program further comprises:
    gathering the data in the DMA processor circuit from an interleaved address location in a plurality of core data memories comprising the core memory; and
    transferring the data from the DMA processor circuit to the system memory.

8. The method of claim 1, wherein the core memory is located in the core device and the system memory is located external to the core device.

9. A method for controlling direct memory access (DMA) transfers, the method comprising:
    loading a first set of DMA addresses for a specific data type in a core device according to execution of a first DMA program by a first DMA processor circuit;
    transferring a first set of data from a core memory to a system memory based on the first set of DMA addresses according to the execution of the first DMA program;
    loading a second set of DMA addresses for a specific data type in the core device according to execution of a second DMA program by a second DMA processor circuit; and
    transferring a second set of data from the system memory to the core memory based on the second set of DMA addresses according to the execution of the second DMA program.

10. The method of claim 9, wherein the first DMA program operates in parallel with the second DMA program.

11. The method of claim 9, wherein the first set of data is gathered from a plurality of core memories and transferred to the system memory.

12. The method of claim 11, wherein the first set of data is gathered according to a specified order of accessing data from each of the plurality of core memories.

13. The method of claim 9, wherein the second set of data is transferred from the system memory to a plurality of core memories.

14. The method of claim 13, wherein the second set of data is transferred according to a specified order of accessing data to each of the plurality of core memories.

15. The method of claim 9, wherein the first DMA processor circuit is operable to execute the first DMA program in parallel with the second DMA processor circuit executing the second DMA program and further in parallel with a core processor located on the core device executing an application program.

16. The method of claim 9, wherein a core processor executing an application program has priority access to the core memory over DMA accesses of the core memory.

17. A method for controlling direct memory access (DMA) transfers, the method comprising:
    loading a first DMA address for a specific data type in a first DMA processor circuit located in a core device according to execution of a first DMA program by the first DMA processor circuit;
    transferring data from a core memory to the first DMA processor circuit based on the first DMA address according to the execution of the first DMA program;
    loading a second DMA address for the specific data type in a second DMA processor circuit located in the core device according to execution of a second DMA program by the second DMA processor circuit; and
    transferring the data from the first DMA processor circuit to the system memory based on the second DMA address according to the execution of the second DMA program.

18. The method of claim 17, wherein the second DMA processor circuit is operable to access the data from the first DMA processor circuit and is further operable to transfer the data to the system memory.

19. The method of claim 17, wherein the first DMA processor circuit is operable to upload the data to the second DMA processor circuit for transfer to the system memory.

20. The method of claim 17, wherein the transfers of data from the first DMA processor circuit to the second DMA processor circuit are DMA to DMA transfers, and wherein the transfer of data from the first DMA processor circuit to the second DMA processor circuit is operable to occur in parallel with a core processor located on the core device executing an application program.

21. The method of claim 17, wherein the data transferred to the first DMA processor circuit is data gathered from an interleaved address location in a plurality of core data memories comprising the core memory.

* * * * *